(12) United States Patent
Ino et al.

(10) Patent No.: US 8,724,478 B2
(45) Date of Patent: May 13, 2014

(54) NETWORK DEVICE AND NETWORK SYSTEM

(75) Inventors: Kensuke Ino, Kamakura (JP); Hiroyuki Yoshino, Kawasaki (JP); Shinji Nozaki, Kawasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 103 days.

(21) Appl. No.: 13/541,008

(22) Filed: Jul. 3, 2012

(65) Prior Publication Data

US 2013/0170359 A1 Jul. 4, 2013

(30) Foreign Application Priority Data

Aug. 30, 2011 (JP) ................................. 2011-187124

(51) Int. Cl.
*H04L 12/26* (2006.01)
*H04L 12/28* (2006.01)

(52) U.S. Cl.
USPC .......................................... 370/241; 370/406

(58) Field of Classification Search
USPC ........................ 370/241–246, 406
See application file for complete search history.

(56) References Cited

U.S. PATENT DOCUMENTS

| 6,574,197 | B1 * | 6/2003 | Kanamaru et al. | 370/252 |
|---|---|---|---|---|
| 2006/0215546 | A1 * | 9/2006 | Tochio | 370/218 |
| 2008/0126536 | A1 | 5/2008 | Sakurai | |
| 2009/0016383 | A1 * | 1/2009 | Suzuki et al. | 370/509 |
| 2011/0075573 | A1 * | 3/2011 | Saigusa et al. | 370/248 |

FOREIGN PATENT DOCUMENTS

| JP | 60-245336 | 12/1985 |
|---|---|---|
| JP | 2008-136013 A | 6/2008 |

* cited by examiner

*Primary Examiner* — Hong Cho
(74) *Attorney, Agent, or Firm* — Foley & Lardner LLP

(57) ABSTRACT

In a ring network including an old master node 100, a new master node 110 is used as a replacement for the old master node 110. During replacement operation, when detecting that two ring ports of the new master node 110 are set in link-up state, the new master node 110 gives a transit node 200 an instruction to forward a health check frame H102 sent from a ring port 102 of the old master node 100 by a forwarding route going through the new master node 110. The new master node 110 can monitor the status of the ring network by receiving the health check frame H102. This configuration enables continuous monitoring for a failure occurring in the ring network during replacement of the master node.

11 Claims, 37 Drawing Sheets

```
 1: vlan-id 100
 2:    interface port 101  port 102
 3: vlan-id 200
 4:    interface port 101  port 102
 5: ring-id 100
 6:    node-mode master
 7:    control-vlan-id 100
 8:    data-vlan-id 200
 9: interface ethernet port 101
10:    ring-port 100
11: interface ethernet port 102
12:    ring-port 100
```

```
 1: vlan-id 100
 2:    interface port 202 port 203 port 204
 3: vlan-id 200
 4:    interface port 201 port 202 port 203 port 204
 5: ring-id 100
 6:    node-mode transit
 7:    control-vlan-id 100
 8:    data-vlan-id 200
 9: interface ethernet port 202
10:    ring-port 100
11: interface ethernet port 203
12:    ring-port 100 leave-port
13: interface ethernet port 204
14:    ring-port 100 join-port
```

```
 1: vlan-id 100
 2:    interface port 302 port 303 port 304
 3: vlan-id 200
 4:    interface port 301 port 302 port 303 port 304
 5: ring-id 100
 6:    node-mode transit
 7:    control-vlan-id 100
 8:    data-vlan-id 200
 9: interface ethernet port 302
10:    ring-port 100
11: interface ethernet port 303
12:    ring-port 100 leave-port
13: interface ethernet port 304
14:    ring-port 100 join-port
```

```
 1: vlan-id 100
 2:    interface port 111 port 112
 3: vlan-id 200
 4:    interface port 111 port 112
 5: ring-id 100
 6:    node-mode new-master
 7:    control-vlan-id 100
 8:    data-vlan-id 200
 9: interface ethernet port 111
10:    ring-port 100
11:    send-watch-mac-address port 101
12:    receive-watch-mac-address port 102
13: interface ethernet port 112
14:    ring-port 100
15:    send-watch-mac-address port 102
16:    receive-watch-mac-address port 101
```

Fig.12

| RING PORT | LINE STATUS | PORT ATTRIBUTE | LOGICAL COMMUNICATION STATUS ||
| --- | --- | --- | --- | --- |
| | | | CONTROL VLAN | DATA VLAN |
| Port 111 | Up | Ordinary | Sending/Receiving Blocked | Sending/Receiving Blocked |
| Port 112 | Up | Ordinary | Sending/Receiving Blocked | Sending/Receiving Blocked |

Fig.13

| VLAN ID | PORT NUMBER | LEARNING STATUS |
| --- | --- | --- |
| 100 | Port 202 | Normal |
| | Port 203 | Normal |
| | Port 204 | Normal |
| 200 | Port 201 | Normal |
| | Port 202 | Normal |
| | Port 203 | Normal |
| | Port 204 | Normal |

| VLAN ID | MAC ADDRESS | PORT NUMBER |
| --- | --- | --- |
| 200 | Terminal 400 | Port 201 |
| 200 | Terminal 500 | Port 202 |

| VLAN ID (2311) | PORT NUMBER (2312) | LEARNING STATUS (2313) |
|---|---|---|
| 100 | Port 302 | Normal |
| | Port 303 | Normal |
| | Port 304 | Normal |
| 200 | Port 301 | Normal |
| | Port 302 | Normal |
| | Port 303 | Normal |
| | Port 304 | Normal |

2300C

2320

| VLAN ID (2321) | MAC ADDRESS (2322) | PORT NUMBER (2323) |
|---|---|---|
| 200 | Terminal 400 | Port 302 |
| 200 | Terminal 500 | Port 301 |

Fig.18

| RING PORT | LINE STATUS | PORT ATTRIBUTE | LOGICAL COMMUNICATION STATUS | |
|---|---|---|---|---|
| | | | CONTROL VLAN | DATA VLAN |
| Port 202 | Up | Ordinary | Non-Blocked | Non-Blocked |
| Port 203 | Up | Leave | Non-Blocked | Non-Blocked |
| Port 204 | Up | Join | Non-Blocked | Sending Blocked |

Fig.19

| VLAN ID | PORT NUMBER | LEARNING STATUS |
|---|---|---|
| 100 | Port 202 | Learning Prohibited |
| | Port 203 | Learning Prohibited |
| | Port 204 | Normal |
| 200 | Port 201 | Normal |
| | Port 202 | Normal |
| | Port 203 | Normal |
| | Port 204 | Learning Prohibited |

FOURTH PHASE (PART 1)

| RING PORT | LINE STATUS | PORT ATTRIBUTE | LOGICAL COMMUNICATION STATUS | |
|---|---|---|---|---|
| | | | CONTROL VLAN | DATA VLAN |
| Port 101 | Up | Ordinary | Sending/Receiving Blocked | Non-Blocked |
| Port 102 | Up | Ordinary | Sending/Receiving Blocked | Non-Blocked |

| RING PORT | LINE STATUS | PORT ATTRIBUTE | LOGICAL COMMUNICATION STATUS | |
|---|---|---|---|---|
| | | | CONTROL VLAN | DATA VLAN |
| Port 202 | Up | Ordinary | Non-Blocked | Non-Blocked |
| Port 203 | Up | Leave | Non-Blocked | Non-Blocked |
| Port 204 | Up | Join | Sending/Receiving Blocked | Sending/Receiving Blocked |

| RING PORT | LINE STATUS | PORT ATTRIBUTE | LOGICAL COMMUNICATION STATUS | |
|---|---|---|---|---|
| | | | CONTROL VLAN | DATA VLAN |
| Port 302 | Up | Ordinary | Non-Blocked | Non-Blocked |
| Port 303 | Up | Leave | Non-Blocked | Non-Blocked |
| Port 304 | Up | Join | Sending/Receiving Blocked | Sending/Receiving Blocked |

| VLAN ID (2311) | PORT NUMBER (2312) | LEARNING STATUS (2313) |
|---|---|---|
| 100 | Port 202 | Normal |
| | Port 203 | Normal |
| | Port 204 | Normal |
| 200 | Port 201 | Normal |
| | Port 202 | Normal |
| | Port 203 | Normal |
| | Port 204 | Normal |

2300B

2320

| VLAN ID (2321) | MAC ADDRESS (2322) | PORT NUMBER (2323) |
|---|---|---|
| 200 | Terminal 400 | Port 201 |
| 200 | Terminal 500 | Port 203 |

| VLAN ID | PORT NUMBER | LEARNING STATUS |
|---|---|---|
| 100 | Port 302 | Normal |
| | Port 303 | Normal |
| | Port 304 | Normal |
| 200 | Port 301 | Normal |
| | Port 302 | Normal |
| | Port 303 | Normal |
| | Port 304 | Normal |

2311 / 2312 / 2313

} 2300C

2320

| VLAN ID | MAC ADDRESS | PORT NUMBER |
|---|---|---|
| 200 | Terminal 400 | Port 303 |
| 200 | Terminal 500 | Port 301 |

| RING PORT | LINE STATUS | PORT ATTRIBUTE | LOGICAL COMMUNICATION STATUS | |
|---|---|---|---|---|
| | | | CONTROL VLAN | DATA VLAN |
| Port 202 | Up | Ordinary | Non-Blocked | Non-Blocked |
| Port 203 | Up | Leave | Non-Blocked | Non-Blocked |
| Port 204 | Up | Join | Non-Blocked | Sending Blocked |

| VLAN ID (2311) | PORT NUMBER (2312) | LEARNING STATUS (2313) |
|---|---|---|
| 100 | Port 202 | Learning Prohibited |
| | Port 203 | Learning Prohibited |
| | Port 204 | Normal |
| 200 | Port 201 | Normal |
| | Port 202 | Normal |
| | Port 203 | Normal |
| | Port 204 | Learning Prohibited |

| RING PORT (2210) | LINE STATUS (2220) | PORT ATTRIBUTE (2230) | LOGICAL COMMUNICATION STATUS | |
|---|---|---|---|---|
| | | | CONTROL VLAN (2240) | DATA VLAN (2250) |
| Port 302 | Up | Ordinary | Non-Blocked | Non-Blocked |
| Port 303 | Up | Leave | Non-Blocked | Non-Blocked |
| Port 304 | Up | Join | Non-Blocked | Sending Blocked |

Fig.40

| VLAN ID | PORT NUMBER | LEARNING STATUS |
|---|---|---|
| 100 | Port 302 | Learning Prohibited |
| | Port 303 | Learning Prohibited |
| | Port 304 | Normal |
| 200 | Port 301 | Normal |
| | Port 302 | Normal |
| | Port 303 | Normal |
| | Port 304 | Learning Prohibited |

Fig.42

| RING PORT | LINE STATUS | PORT ATTRIBUTE | LOGICAL COMMUNICATION STATUS | |
|---|---|---|---|---|
| | | | CONTROL VLAN | DATA VLAN |
| Port 111 | Up | Ordinary | Sending/Receiving Blocked | Non-Blocked |
| Port 112 | Up | Ordinary | Sending/Receiving Blocked | Non-Blocked |

| RING PORT | LINE STATUS | PORT ATTRIBUTE | LOGICAL COMMUNICATION STATUS | |
|---|---|---|---|---|
| | | | CONTROL VLAN | DATA VLAN |
| Port 202 | Up | Ordinary | Non-Blocked | Non-Blocked |
| Port 203 | Up | Leave | Non-Blocked | Sending Blocked |
| Port 204 | Up | Join | Non-Blocked | Non-Blocked |

| VLAN ID | PORT NUMBER | LEARNING STATUS |
|---|---|---|
| 100 | Port 202 | Learning Prohibited |
| | Port 203 | Learning Prohibited |
| | Port 204 | Normal |
| 200 | Port 201 | Normal |
| | Port 202 | Normal |
| | Port 203 | Learning Prohibited |
| | Port 204 | Learning Prohibited |

2311, 2312, 2313

NETWORK DEVICE AND NETWORK SYSTEM

CROSS REFERENCE TO RELATED APPLICATIONS

This application claims the priority based on Japanese Patent Application No. 2011-187124 filed on Aug. 30, 2011, the disclosure of which is hereby incorporated by reference in its entirety.

BACKGROUND

1. Technical Field

The invention relates to network technology applied to form a ring network. The network technology includes a network device, a network system including the network device and a computer program product configured to control the network device. The network device represents a hardware component to form a network interconnecting computers and may be, for example, router, switch, hub, or network interface card.

2. Description of the Related Art

In a layer 2 network, when a failure is detected in some line of the network or in a network device, the general control procedure changes the communication route to an alternative route provided in advance, thus ensuring the redundancy of the network. The layer 2 network with the redundancy has the loop structure. In order to avoid the routing loop, part of the network device included in the layer 2 network is set in the state where forwarding of user traffic is not allowed.

One proposed protocol to control the prohibition or the permission for forwarding the user traffic is specifically applied to a ring network, in which a plurality of network devices are arranged in a ring shape. One of the network devices forming the ring network is specified as a master node, while the other network devices are specified as transit nodes. The master node monitor the status of the ring network by periodically sending a control frame from one of ring ports and receiving the control frame at the other of the ring ports. In the state where the control frame is received at the other ring port, the master node determines that the ring network has the loop structure, and prohibits forwarding the user traffic. In the state where the control frame is not received at the other ring port, on the other hand, the master node determines that a failure occurs in the ring network, cancels prohibition of forwarding the user traffic and changes the forwarding route of the user traffic to an alternative route going through the master node. This ensures the redundancy of the network. The protocol to control the ring network by this method is called "ring protocol".

In the ring network, in order to meet the future need for bandwidth expansion, there may be a requirement to replace an existing network device with a new network device that supports the line for ultra-high transmission rate. The following problem may arise during replacement of the existing network device serving as the master node with a new network device.

The general replacement operation of the master node detaches the old master node as the object to be replaced from the ring network and subsequently attaches a new master node to the ring network. This operation does not allow the status of the ring network to be monitored with control frames and thereby prevents detection of the occurrence of a failure in the ring network for a time period between the detachment of the old master node and the attachment of the new master node.

SUMMARY

Consequently, there is a need to enable continuous monitoring for a failure occurring in a ring network during replacement of a master node.

In order to achieve at least part of the foregoing, the invention provides various aspects and embodiments described below.

A first aspect directs to a network device as a replacement for a monitoring device as an object to be replaced, the monitoring device being provided as part of a ring network and configured to monitor status of the ring network by repeatedly sending a control frame used to monitor the status of the ring network from one of two ring ports and receiving the control frame at the other of the two ring ports. The network device comprises: a link-up detector configured to detect that two ring ports of the network device are set in link-up state, when the network device is connected between first and second adjacent network devices, which are located adjacent to the monitoring device in the ring network, to be arranged in parallel with the monitoring device; a forwarding instructor configured to, when the link-up state is detected by the link-up detector, give an instruction to forward the control frame by a forwarding route going through the network device, to the first adjacent network device connected with the ring port of the monitoring device that receives the control frame, out of the first and second adjacent network devices; and a replacement-time monitor configured to monitor the status of the ring network by receiving the control frame sent from the first adjacent network device.

The network device according to the first aspect is connected to be arranged in parallel with the monitoring device and monitors the status of the ring network by receiving the control frame sent from the monitoring device. The network device of the first aspect thus enables continuous monitoring for a failure occurring in the ring network during replacement operation of the monitoring device with the network device of the first aspect.

The "monitoring device" according to the first aspect is configured to send the control frame from one of the ring ports and receive the control frame at the other of the ring ports. This configuration means that the frame-sending ring port is different from the frame-receiving ring port and does not exclude the configuration that control frames are respectively sent from the two ring ports. This configuration may accordingly include both or either one of the following two operations (i) and (ii):

(i) sending a first control frame from a first ring port and receiving the first control frame at a second ring port; and (ii) sending a second control frame from the second ring port and receiving the second control frame at the first ring port.

According to one embodiment, the network device of the first aspect may further comprise a ring port status table used to specify state of each ring port and configured to include a logical communication status filed of a control VLAN used in communication of the control frame, wherein the forwarding instructor gives the instruction by changing registry in the logical communication status field of the control VLAN in the ring port status table.

The network device according to this embodiment changes the setting in the logical communication status of the control VLAN, so as to give the instruction to forward the control frame by the forwarding route going through the network device. This configuration effectively changes the forwarding route of the control frame.

According to another embodiment, the network device of the first aspect may further comprise: a monitoring disabled detector configured to detect that monitoring function of the monitoring device is disabled in the ring network; and a monitoring processor configured to, when disabling the monitoring function of the monitoring device is detected by the monitoring disabled detector, enable the network device itself to start sending the control frame, so as to monitor the status of the ring network.

In the network device according to this embodiment, when the monitoring function of the monitoring device is disabled in the ring network, the monitoring processor starts sending the control frame to the ring network. As a result, the network device of this embodiment can monitor the status of the ring network without assistance of the monitoring device. This completes replacement of the monitoring device in the ring network.

According to another embodiment, in the network device of the first aspect, when the link-up state is detected by the link-up detector, the forwarding instructor may give the instruction to forward the control frame by the forwarding route going through the network device, to the second adjacent network device located upstream in a flow of the control frame, out of the first and second adjacent network devices, and the replacement-time monitor may monitor the status of the ring network by receiving the control frame sent from the first adjacent network device and the control frame sent from the second adjacent network device.

The network device according to the first aspect described above can monitor the status of the ring network by "reception monitoring" that checks the successful reach of the control frame, i.e., whether the control frame goes around the ring network. The network device according to this embodiment, on the other hand, can monitor the status of the ring network by "transmission monitoring" that checks whether the monitoring device sends the control frame. This configuration enables monitoring the abnormality in the ring network with higher accuracy.

According to another embodiment, the monitoring device may comprise a data forwarding controller. On condition that the control frame is received at the other ring port, the data forwarding controller determines that the ring network is normal and sets one of the two ring ports of the monitoring device in a sending/receiving disabled state that is incapable of sending and receiving user traffic. On condition that the control frame is not received at the other ring port, the data forwarding controller determines that the ring network is abnormal and changing setting of the ring port, which has been set in the sending/receiving disabled state, to a sending/receiving enabled state that is capable of sending and receiving the user traffic.

The monitoring device of this embodiment effectively avoids the routing loop of the user traffic in the normal state of the ring network, while changing the forwarding route of the user traffic to the forwarding route going through the monitoring device in the abnormal state of the ring network.

A second aspect directs to a network device connecting with a ring port of a monitoring device used to receive a control frame, in a ring network including a monitoring device provided as part of the ring network and configured to monitor status of the ring network by repeatedly sending a control frame used to monitor the status of the ring network from one of two ring ports and receiving the control frame at the other of the two ring ports, a network device connected with the ring port of the monitoring device used to receive the control frame. The network device comprises: a start notification frame receiver configured to receive a start notification frame sent from a new network device, on condition that the new network device used as a replacement for the monitoring device as an object to be replaced is located between the network device and an adjacent network device connected with the ring port of the monitoring device used to send the control frame in the ring network to be arranged in parallel with the monitoring device and that two ring ports of the new network device are set in link-up state; and a control frame forwarder configured to, when the start notification frame is received, forward the control frame sent from the monitoring device by a forwarding route going through the new network device.

In the ring network, the network device according to the second aspect is connected with the ring port of the monitoring device used to receive the control frame. On condition that the two ring ports of the new network device connected to be arranged in parallel with the monitoring device as the object to be replaced are set in link-up state, when receiving the start notification frame sent from the new network device, the network device of the second aspect forwards the control frame transmitted from the monitoring device through the ring network by the forwarding route going through the new network device. The new network device can thus monitor the status of the ring network by receiving the control frame. The ring network including the network device according to the second aspect thus enables continuous monitoring for a failure occurring in the ring network during replacement of the monitoring device with the new network device.

The invention is not limited to the network device according to any of the above aspects and the embodiments but may be implemented by various other applications, for example, a network system comprising the network device according to the first aspect, a network system comprising the network device according to the second aspect, a computer program product comprising program codes to implement the functions of the respective components included in the network device of the first aspect, and a computer program product comprising program codes to implement the functions of the respective components included in the network device of the second aspect. Additionally, the invention may be implemented by a control method comprising steps to implement the respective functions in each of the computer program products or a storage medium configured to store each of the computer programs.

BRIEF DESCRIPTION OF THE DRAWINGS

FIG. 5 is a diagram showing the contents of a configuration table stored in an old master node;

FIG. 6 is a diagram showing the contents of a configuration table stored in a transit node;

FIG. 7 is a diagram showing the contents of a configuration table stored in a transit node;

FIG. 8 is a diagram showing the contents of a configuration table stored in a new master node;

FIG. 12 is a diagram showing the contents of a ring port status table stored in the new master node;

FIG. 13 is a diagram showing the contents of an FDB table stored in the transit node;

FIG. 14 is a diagram showing the contents of an FDB table stored in the transit node;

FIG. 18 is a diagram showing the contents of the ring port status table stored in the transit node after the monitor start notification frame receiving process;

FIG. 19 is a diagram showing the contents of an FDB status table stored in the transit node after the monitor start notification frame receiving process;

FIG. 32 is a diagram showing the contents of the ring port status table stored in the old master node;

FIG. 33 is a diagram showing the contents of the ring port status table stored in the transit node;

FIG. 34 is a diagram showing the contents of the ring port status table stored in the transit node;

FIG. 35 is a diagram showing the contents of the FDB table stored in the transit node;

FIG. 36 is a diagram showing the contents of the FDB table stored in the transit node;

FIG. 37 is a diagram showing the contents of the ring port status table stored in the transit node after reception of a monitor start notification frame F11;

FIG. 38 is a diagram showing the contents of the FDB status table stored in the transit node after reception of the monitor start notification frame;

FIG. 39 is a diagram showing the contents of the ring port status table stored in the transit node after reception of a monitor start notification frame;

FIG. 40 is a diagram showing the contents of the FDB status table stored in the transit node after reception of the monitor start notification frame;

FIG. 42 is a diagram showing the contents of the ring port status table stored in the new master node on the occurrence of a failure;

FIG. 44 is a diagram showing the contents of the ring port status table stored in the transit node after reception of a transition start notification frame;

FIG. 45 is a diagram showing the contents of the FDB status table stored in the transit node after reception of the transition start notification frame;

DESCRIPTION OF THE PREFERRED EMBODIMENTS

Figure 1:
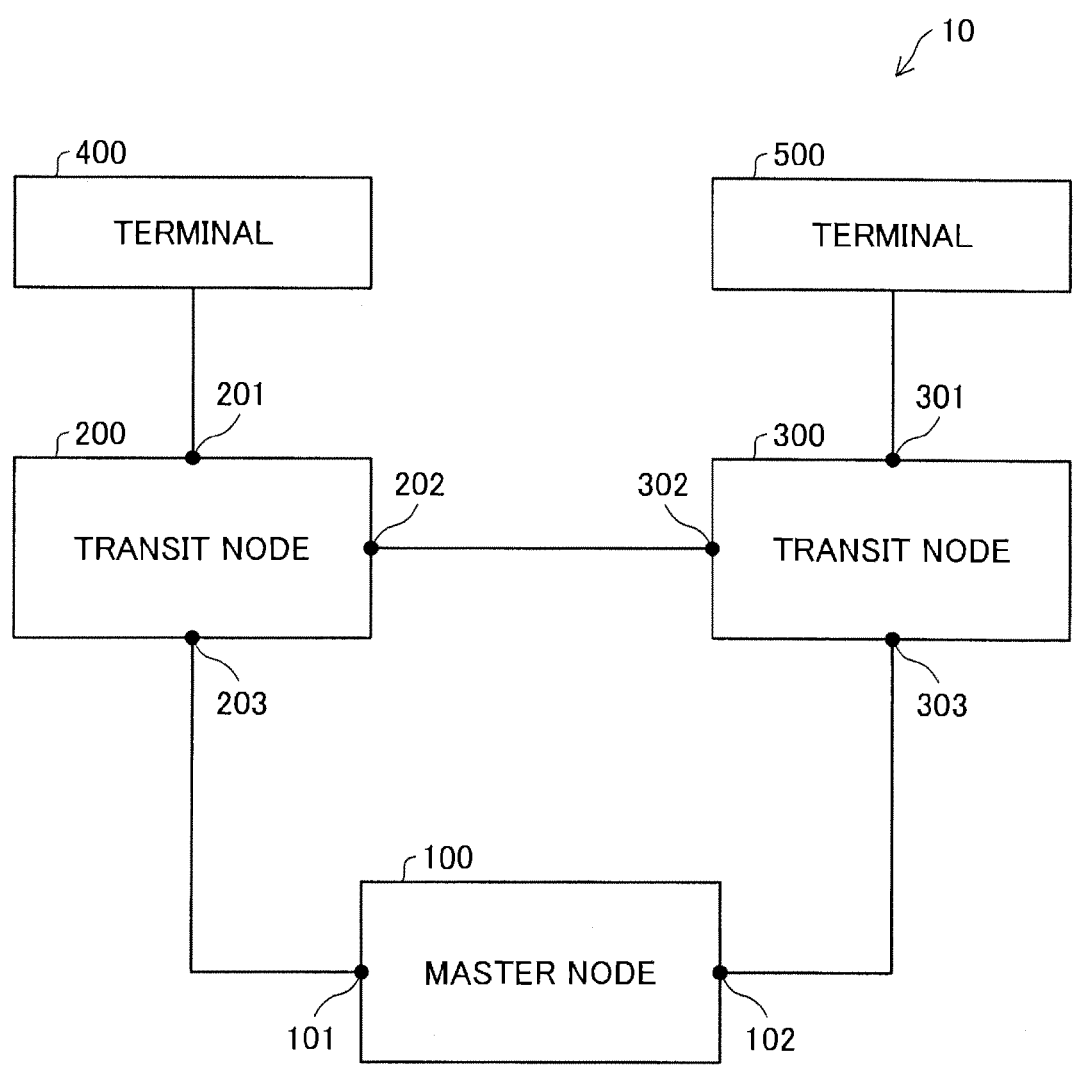
FIG. 1 is a diagram illustrating the configuration of a network system before replacement of a master node according to one embodiment of the invention.

An aspect of the invention is described in detail below in the following sequence with reference to some embodiments with the accompanying drawings:

A. System Configuration
B. Structure of Network Device
C. Contents of Table
D. Master Node Replacement Operation 1
E. Master Node Replacement Operation 2
F. Advantageous Effects of Embodiment
G. Modifications A. System Configuration FIG. 1 is a diagram illustrating the configuration of a network system 10 before replacement of the master node according to one embodiment of the invention. As illustrated, the network system 10 before replacement of the master node includes first to third network devices 100, 200 and 300 arranged to constitute a ring network, as well as first and second terminals 400 and 500. The first terminal 400 is connected with the second network device 200, whilst the second terminal 500 is connected with the third network device 300.

The respective network devices 100, 200 and 300 relay frames on layer 2, so as to allow the respective terminals 400 and 500 to establish communication in user traffic. The "terminal" in the description hereof means a computer device including a computer body, a display, a mouse and a keyboard.

The first network device 100 serves as a master node to send a health check frame and monitor the ring network. In the description hereinafter, the first network device is also called "master node". The health check frame is a control frame used to monitor the state of the ring network. The second and the third network devices 200 and 300 serve as transit nodes to relay the health check frame. In the description hereinafter, the second and the third network devices are also called "transit nodes".

The master node 100 is connected at a port 101 with the transit node 200 via a line and is connected at a port 102 with the transit node 300 via a line. The transit node 200 is connected at a port 201 with the terminal 400 via a line, is connected at a port 202 with the transit node 300 via a line and is connected at a port 203 with the master node 100 via the line. The transit node 300 is connected at a port 301 with the terminal 500 via a line, is connected at a port 302 with the transit node 200 via the line and is connected at a port 303 with the master node 100 via the line.

The master node 100 and the transit nodes 200 and 300 use a ring protocol for layer 2 routing control. The ring network includes a VLAN (Virtual LAN) serving to forward a protocol frame for controlling the ring network and at least one VLAN serving to forward user traffic. In the description hereinafter, the VLAN serving to forward the protocol frame for controlling the ring network is called "control VLAN", and the VLAN serving to forward the user traffic is called "data VLAN".

Figure 2:
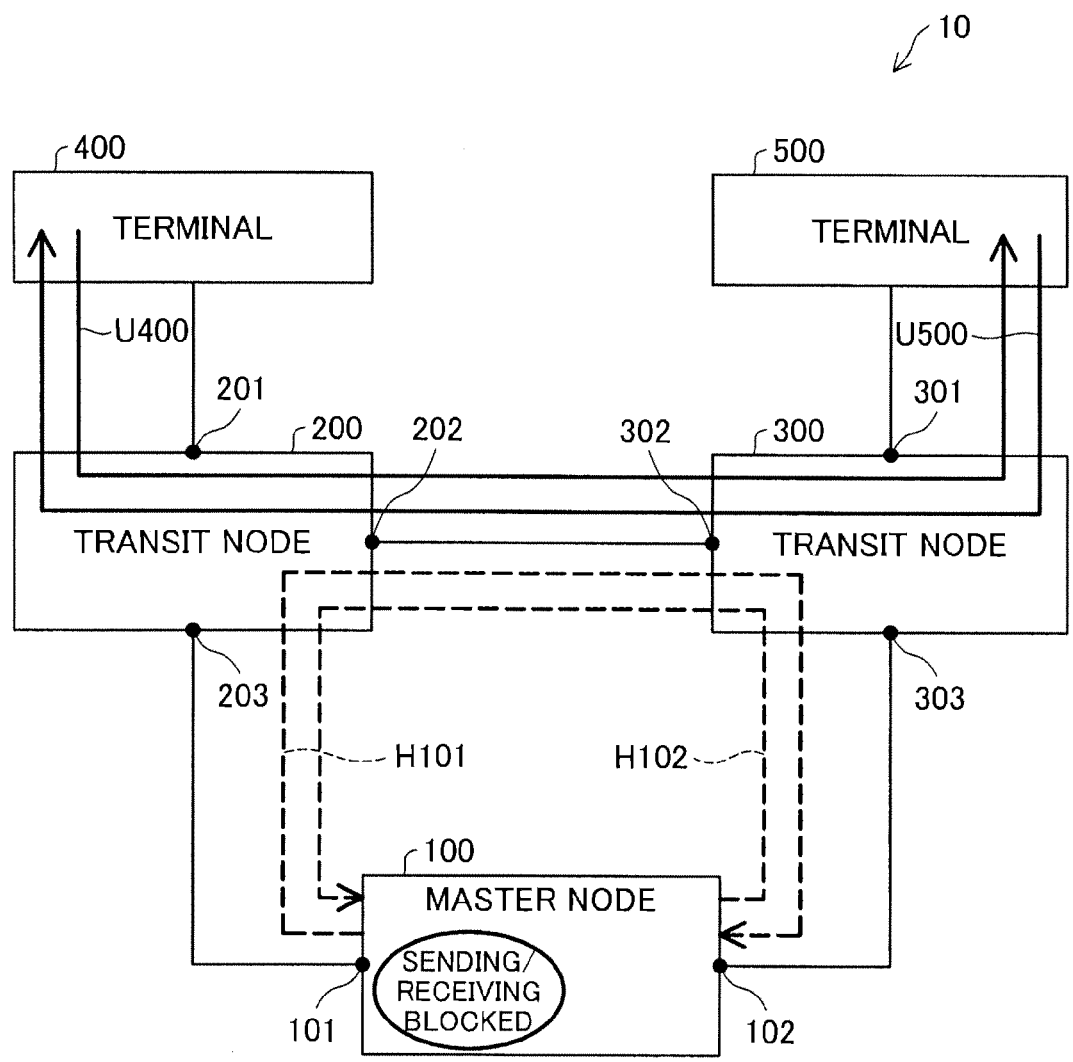
FIG. 2 is a diagram schematically illustrating forwarding routes in the network system.

FIG. 2 is a diagram schematically illustrating forwarding routes in the network system 10. Although the network system 10 has the loop structure, the respective network devices 100, 200 and 300 employ the ring protocol to avoid the routing loop of the layer 2 network.

The port connecting between the network devices is called "ring port". The master node 100 periodically sends health check frames H101 and H102 from the control VLANs of the ring port 101 and the ring port 102, i.e., the VLANs used to forward control frames, such as health check frames or Flush request frames. The health check frames H101 and H102 are forwarded by the respective transit nodes 200 and 300 and are terminated when being received by the master node 100. More specifically, the health check frame H101 goes around the ring network in the network system 10, i.e., through the master node 100, the transit node 200, the transit node 300, and the master node 100. The health check frame H102 similarly goes around the ring network, i.e., through the master node 100, the transit node 300, the transit node 200 and the master node 100.

The master node 100 determines the state where the health check frames H101 and H102 are received at either one or both of the ring ports 101 and 102, as "normal". In the normal state, the master node 100 sets the logical communication status of the data VLAN of either the port 101 or the port 102 used to forward the user traffic to "sending/receiving blocked" state, so as to avoid the routing loop of the network. The "sending/receiving blocked" state means that both transmission and reception are disabled. In this embodiment, the logical communication status of the port 101 is set to the "sending/receiving blocked" state.

User traffic U400 sent by the first terminal 400 is relayed through only the port 202 having the logical communication status of the data VLAN set to "non-blocked" state by the transit node 200 and only the port 301 having the logical communication status of the data VLAN set to "non-blocked" state by the transit node 300 and eventually reaches the second terminal 500. Like this user traffic U400, user traffic U500 sent by the second terminal 500 is similarly relayed through the transit node 300 and the transit node 200 and eventually reaches the first terminal 400.

When both the ring ports 101 and 102 of the master node 100 fail to receive the health check frames H101 and H102, the master node 100 detects the occurrence of a failure in the ring network. In this case, the master node 100 changes the logical communication status of the ring port 101 or the ring port 102, which was previously set to the "sending/receiving blocked" state, to the "non-blocked" state and further changes the network topology. The changed network topology will be described in detail later. The master node 100 corresponds to the "monitoring device" in the first aspect of the invention described in

SUMMARY

Figure 3:
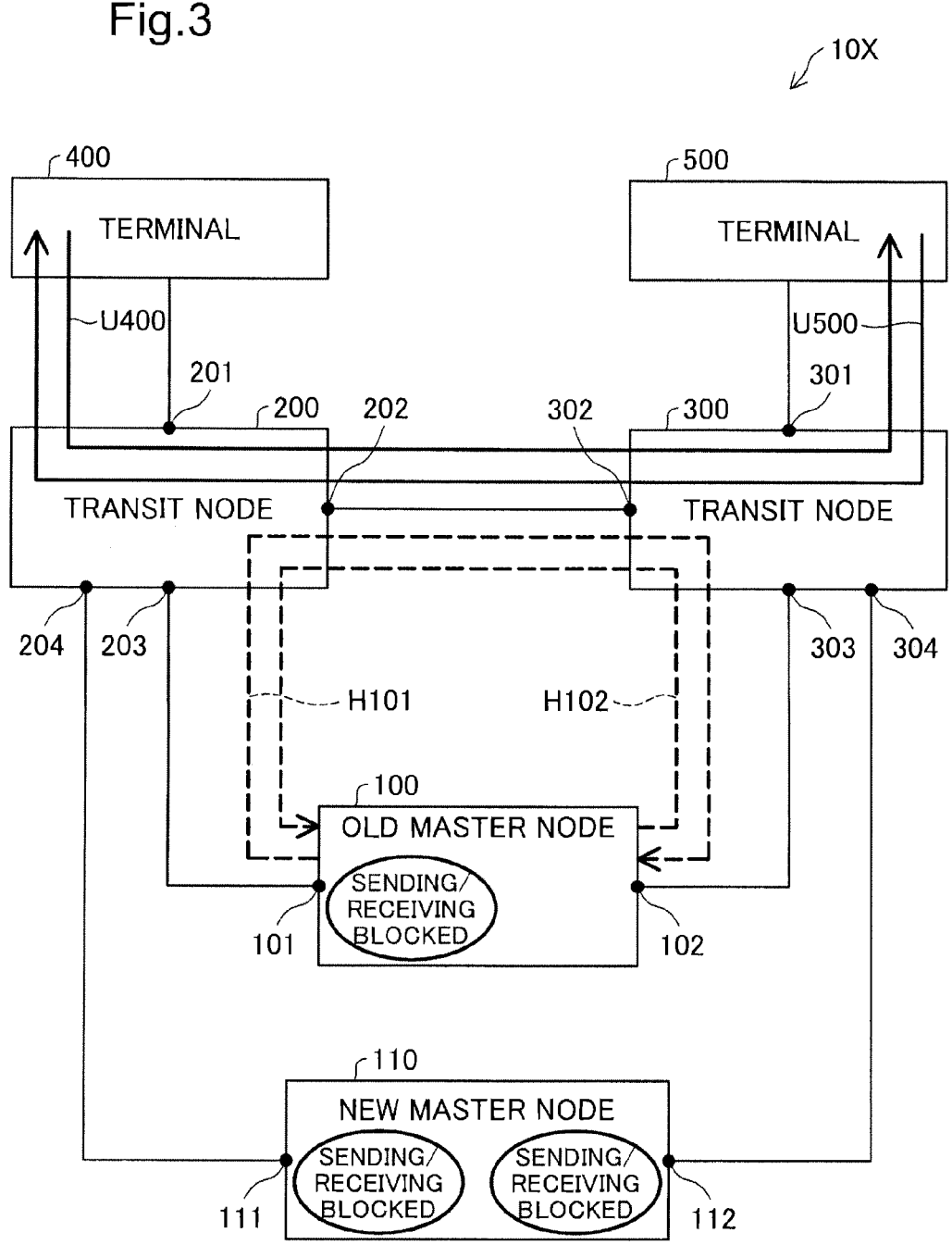
FIG. 3 is a diagram illustrating the configuration of the network system during replacement of the master node.

FIG. 3 is a diagram illustrating the configuration of the network system 10 during replacement of the master node. As illustrated, the network system 10 during replacement of the master node (hereinafter this is referred to as "network system 10X", in order to distinguish from the network system 10 before replacement of the master node) includes the same components (master node 100, transit nodes 200 and 300 and terminals 400 and 500) as those of the network system 10 before replacement of the master node, and additionally has a master node 110 as a replacement (hereinafter also called "new master node"), which is located between the transit node 200 and the transit node 300 and is arranged parallel to the master node 100 to be replaced (hereinafter also called "old master node"). The new master node is also called "fourth network device".

The transit node 200 is connected at a port 204 with the new master node 110 via a line. The connections of the ports 201, 202 and 203 are the same as those of FIG. 1 and are not specifically described here. The transit node 300 is connected at a port 304 with the new master node 110 via a line. The connections of the ports 301, 302 and 303 are the same as those of FIG. 1 and are not specifically described here. The new master node 110 is connected at a port 111 with the transit node 200 via the line, while being connected at a port 112 with the transit node 300 via the line. The logical communication status of the data VLAN in the new master node 110 will be described later.

B. Structure of Network Device

Figure 4:
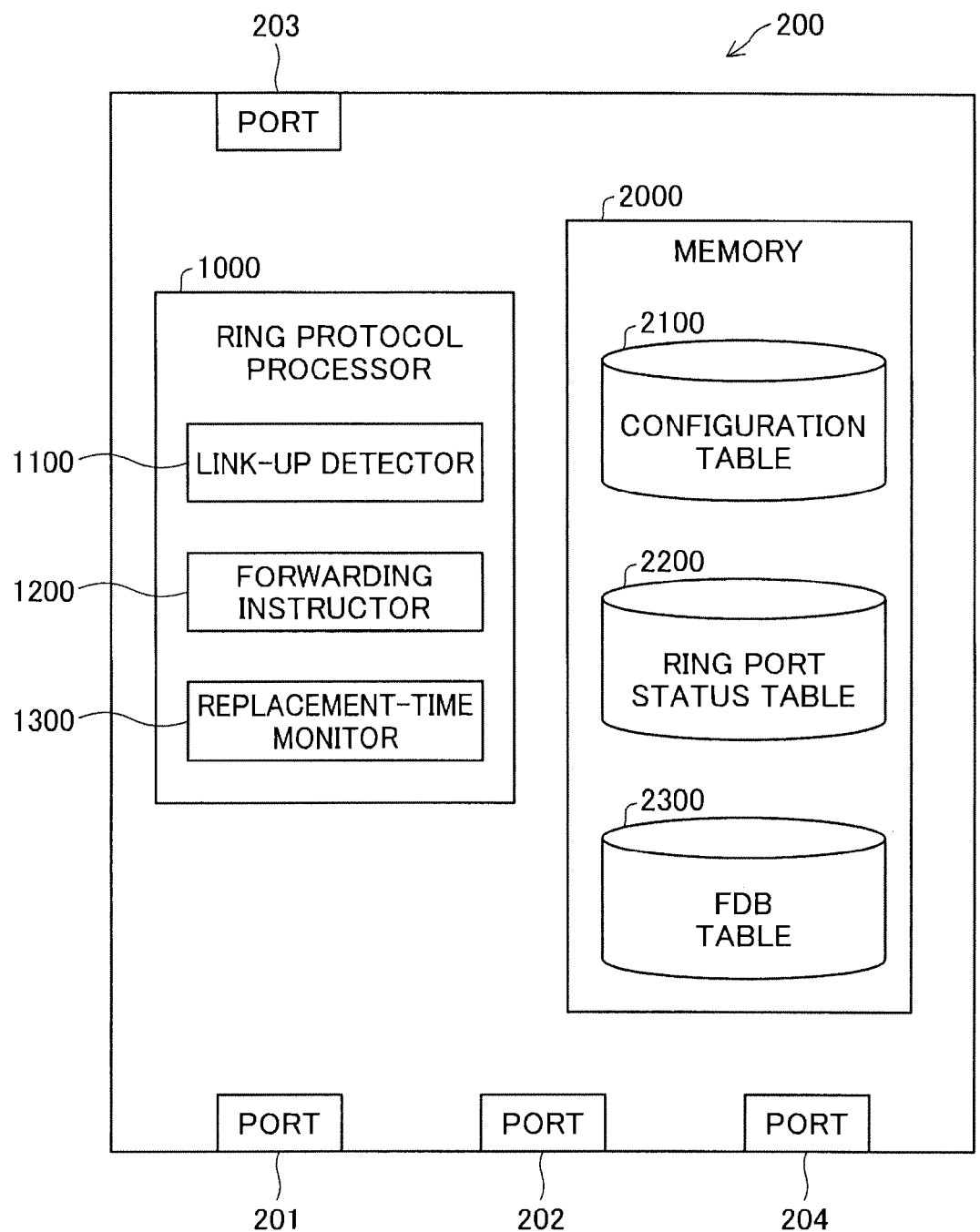
FIG. 4 is a diagram illustrating the structure of a network device.

FIG. 4 is a diagram illustrating the structure of the network device. The structure of the second network device 200 serving as the transit node is illustrated in FIG. 2. The other network devices 100, 300 and 110 have similar structure.

The network device 200 has ports used to connect with other network devices and terminals via lines. In the illustrated example, the second network device 200 has four ports 201, 202, 203 and 204. The network device 200 also has a ring protocol processor 1000 and a memory 2000.

The memory 2000 stores a configuration table 2100, a ring port status table 2200 and an FDB (Filtering Database) table 2300.

The ring protocol processor 1000 controls the ring protocol and the ring ports and manages the configuration table 2100, the ring port status table 2200 and the FDB table 2300. The ring protocol processor 1000 serves as a link-up detector 1100, a forwarding instructor 1200 and a replacement-time monitor 1300 implemented as functional blocks.

The following describes the contents of the respective tables stored in the memory 2000. The first to the fourth network devices 100, 200, 300 and 110 have the different contents of these tables. In the following description, the subscript "A" is added to the respective tables 2100, 2200 and 2300 stored in the first network device 100. Similarly, the subscript "B", the subscript "C" and the subscript "D" are respectively added to the tables stored in the second network device 200, the tables stored in the third network device 300 and the tables stored in the fourth network device 110.

C. Contents of Table

<Configuration Table>

FIG. 5 is a diagram showing the contents of the configuration table 2100A stored in the old master node 100. The following describes the meanings of the respective lines:

The 1st line shows the network of the VLAN with ID 100;

The 2nd line shows that the ports 101 and 102 belong to the VLAN with ID 100;

The 3rd line shows the network of the VLAN with ID 200;

The 4th line shows that the ports 101 and 102 belong to the VLAN with ID 200;

The 5th line shows the ID uniquely allocated to the ring network according to the ring protocol. The network devices belonging to the same ring network have the same ring ID. This line specifically means that the old master node 100 belongs to the ring network with ring ID 100;

The 6th line shows the node mode (function) of the network device in the ring network and is used to differentiate among the master node (old master node), the transmit node and the new master node. This line specifically means that the node mode of the old master node 100 is "master node";

The 7th line shows that the VLAN with ID 100 is used as the control VLAN;

The 8th line shows that the VLAN with ID 200 is used as the data VLAN;

The 9th line shows that the port 101 is used;

The 10th line shows that the port 101 is the ring port belonging to the ring network with ring ID 100;

The 11th line shows that the port 102 is used; and

The 12th line shows that the port 102 is the ring port belonging to the ring network with ring ID 100.

FIG. 6 is a diagram showing the contents of the configuration table 2100B stored in the transit node 200. The following describes the meanings of the respective lines:

The 1st line shows the network of the VLAN with ID 100;

The 2nd line shows that the ports 202, 203 and 204 belong to the VLAN with ID 100;

The 3rd line shows the network of the VLAN with ID 200;

The 4th line shows that the ports 201, 202, 203 and 204 belong to the VLAN with ID 200;

The 5th line shows that the transit node 200 belongs to the ring network with ring ID 100;

The 6th line shows that the node mode of the transit node 200 is "transit node";

The 7th line shows that the VLAN with ID 100 is used as the control VLAN;

The 8th line shows that the VLAN with ID 200 is used as the data VLAN;

The 9th line shows that the port 202 is used;

The 10th line shows that the port 202 is the ring port belonging to the ring network with ring ID 100;

The 11th line shows that the port 203 is used;

The 12th line shows that the port 203 is the ring port belonging to the ring network with ring ID 100. The port attribute of each port under management is one of "leave" port to be separated from the ring network by replacement of the master node, "join" port to be newly added to the ring network by replacement of the master node, and "ordinary" port that is neither the "leave" port nor the "join" port. The port that is not specified as either the "leave" port or the "join" port is operated as the "ordinary" port. This line specifically means that the port attribute of the port 203 is the "leave" port;

The 13th line shows that the port 204 is used; and

The 14th line shows that the port 204 is the ring port belonging to the ring network with ring ID 100 and that the port attribute of the port 204 is the "join" port.

FIG. 7 is a diagram showing the contents of the configuration table 2100C stored in the transit node 300. The following describes the meanings of the respective lines:

The 1st line shows the network of the VLAN with ID 100;

The 2nd line shows that the ports 302, 303 and 304 belong to the VLAN with ID 100;

The 3rd line shows the network of the VLAN with ID 200;

The 4th line shows that the ports 301, 302, 303 and 304 belong to the VLAN with ID 200;

The 5th line shows that the transit node 300 belongs to the ring network with ring ID 100;

The 6th line shows that the node mode of the transit node 300 is "transit node";

The 7th line shows that the VLAN with ID 100 is used as the control VLAN;

The 8th line shows that the VLAN with ID 200 is used as the data VLAN;

The 9th line shows that the port 302 is used;

The 10th line shows that the port 302 is the ring port belonging to the ring network with ring ID 100;

The 11th line shows that the port 303 is used;

The 12th line shows that the port 303 is the ring port belonging to the ring network with ring ID 100 and that the port attribute of the port 303 is the "leave" port;

The 13th line shows that the port 304 is used; and

The 14th line shows that the port 304 is the ring port belonging to the ring network with ring ID 100 and that the port attribute of the port 304 is the "join" port.

FIG. 8 is a diagram showing the contents of the configuration table 2100D stored in the new master node 110. The following describes the meanings of the respective lines:

The 1st line shows the network of the VLAN with ID 100;

The 2nd line shows that the ports 111 and 112 belong to the VLAN with ID 100;

The 3rd line shows the network of the VLAN with ID 200;

The 4th line shows that the ports 111 and 112 belong to the VLAN with ID 200;

The 5th line shows that the new master node 110 belongs to the ring network with ring ID 100;

The 6th line shows that the node mode of the new master node 110 is "new master node";

The 7th line shows that the VLAN with ID 100 is used as the control VLAN;

The 8th line shows that the VLAN with ID 200 is used as the data VLAN;

The 9th line shows that the port 111 is used;

The 10th line shows that the port 111 is the ring port belonging to the ring network with ring ID 100;

The 11th line shows the source MAC (Media Access Control) address of the health check frame, which is subjected to transmission monitoring at the ring port 111. This line specifically means that the ring port 111 performs transmission monitoring (send watch) of the health check frame sent from the port 101 of the old master node 100 (the details of the transmission monitoring process will be described later with reference to FIGS. 22 and 23);

The 12th line shows the source MAC address of the health check frame, which is subjected to reception monitoring at the ring port 111. This line specifically means that the ring port 111 performs reception monitoring (receive watch) of the health check frame sent from the port 102 of the old master node 100 (the details of the reception monitoring process will be described later with reference to FIGS. 22 and 23);

The 13th line shows that the port 112 is used;

The 14th line shows that the port 112 is the ring port belonging to the ring network with ring ID 100;

The 15th line shows that the ring port 112 performs transmission monitoring of the health check frame sent from the port 102 of the old master node 100; and The 16th line shows that the ring port 112 performs reception monitoring of the health check frame sent from the port 101 of the old master node 100.

<Ring Port Status Table>

Figure 9:
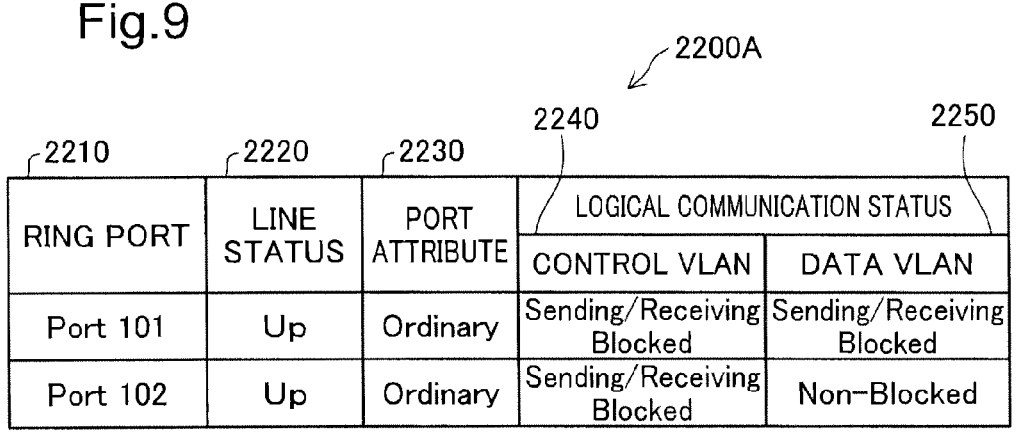
FIG. 9 is a diagram showing the contents of a ring port status table stored in the old master node.

FIG. 9 is a diagram showing the contents of the ring port status table 2200A stored in the old master node 100. As illustrated in FIG. 9, the ring port status table 2200A has a ring port field 2210, a line status filed 2220, a port attribute field 2230, a logical communication status field 2240 of the control VLAN and a logical communication status field 2250 of the data VLAN.

The ring port field 2210 shows the ring ports and has the registry extracted from the configuration table 2100A. In the old master node 100, "port 101" and "port 102" are registered in the ring port field 2210.

The line status field 2220 shows the line status of each of the registered ring ports as the binary code of "Up" or "Down". In the old master node 100, the lines are ready for communication with the port 101 connected with the transit node 200 and the port 102 connected with the transit node 300, so that "Up" is registered for both the "port 101" and the "port 102" in the line status field 2220.

The port attribute field 2230 shows the attribute of each registered ring port during replacement of the master node and has the registry extracted from the configuration table 2100A. In the old master node 100, "ordinary" is registered for both the "port 101" and the "port 102" in the port attribute field 2230. The port attribute registered in the port attribute field 2230 may be one of the "leave" port, the "join" port and the "ordinary" port as described above. The port attribute is managed by the transit node, so that "ordinary" is registered as the port attribute in both the old master node and the new master node.

The logical communication status field 2240 of the control VLAN shows the logical communication status of each ring port with respect to the control frame transmitted in the control VLAN. The logical communication status is managed by the trinary code, "sending/receiving blocked" state showing that both transmission and reception are disabled, "non-blocked" state showing that both transmission and reception are enabled and "sending blocked" state showing that transmission is disabled but reception is enabled. In order to terminate all the ring protocol control frames, the logical communication status of the control VLAN is fixed to the "sending/receiving blocked" state in the master node (including the old master node and the new master node). The "sending/receiving blocked" state is accordingly registered for both the "port 101" and the "port 102" in the logical communication status field 2240 of the control VLAN in the old master node 100.

The logical communication status field 2250 of the data VLAN shows the logical communication status of each ring port with respect to the user traffic transmitted in the data VLAN. In order to avoid the routing loop of the user traffic, the logical communication status of the data VLAN has the default setting of "sending/receiving blocked" state in all the master nodes (including the old master node and the new master node) and the transit nodes. The logical communication status of the data VLAN may then be changed to "non-blocked" state or "sending blocked" state or may be kept to "sending/receiving blocked" state by the control of the ring protocol. The "sending/receiving blocked" state is registered for the "port 101" and the "non-blocked" state is registered for the "port 102" by the control of the ring protocol in the logical communication status field 2250 of the data VLAN in the old master node 100.

Figure 10:
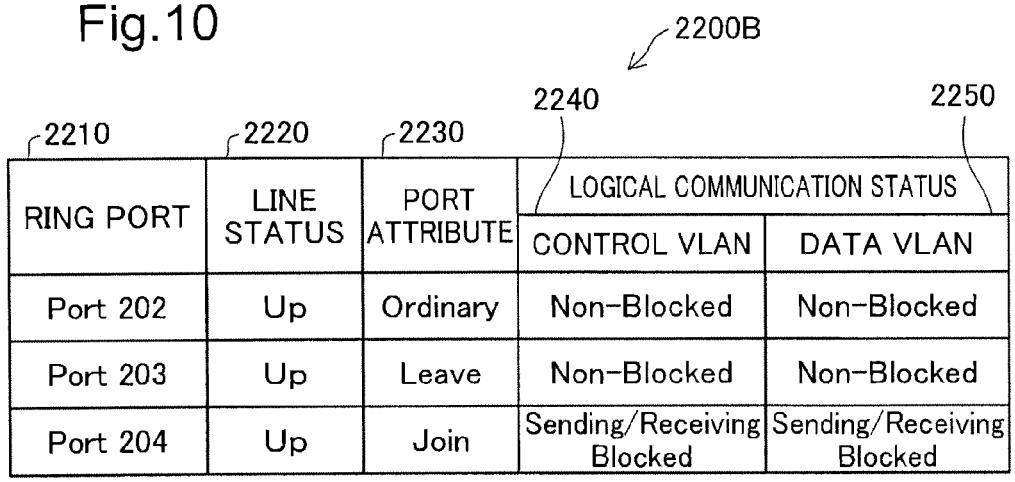
FIG. 10 is a diagram showing the contents of a ring port status table stored in the transit node.

FIG. 10 is a diagram showing the contents of the ring port status table 2200B stored in the transit node 200. As illustrated in FIG. 10, the ring port status table 2200B has the same fields as those of the ring port status table 2200A stored in the old master node 100. The meanings of the respective fields are identical with those of FIG. 9 and are not specifically described here. The following describes the specific settings registered in the respective fields of the ring port status table 2200B of FIG. 10.

In the transit node 200, "port 202", "port 203" and "port 204" are registered in the ring port field 2210. The port 201 is connected directly with the terminal 400 and is thereby exempt from the control of the ring protocol.

In the transit node 200, since the lines are ready for communication with the port 202 connected with the transit node 300, the port 203 connected with the old master node 100 and the port 204 connected with the new master node 110, "Up" is registered for all the "port 202", "port 203" and "port 204" in the line status field 2220. In the transit node 200, the attribute "ordinary" is registered for the "port 202", the attribute "leave" is registered for the "port 203" and the attribute "join" is registered for the "port 204" in the port attribute field 2230.

The "non-blocked" state is registered for the "port 202" and the "port 203" and the "sending/receiving blocked" state is registered for the "port 204" in the logical communication status field 2240 of the control VLAN in the transit node 200. The logical communication status of the control VLAN in the transit node is fixed to the "non-blocked" state in correlation to the port attribute "ordinary", while being set to the "non-blocked" state as the default setting in correlation to the port attribute "leave" and the "sending/receiving blocked" state as the default setting in correlation to the port attribute "join".

The "non-blocked" state is registered for the "port 202" and the "port 203" and the "sending/receiving blocked" state is registered for the "port 204" by the control of the ring protocol in the logical communication status field 2250 of the data VLAN in the transit node 200.

In the data VLAN, the frame received at the port having the registry of either the "join" attribute or the "leave" attribute in the port attribute field 2230 is forwarded only to the port having the registry of the "ordinary" attribute in the port attribute field 2230 and the port exempt from the control of the ring protocol. Even when the setting in the logical communication status field 2250 of the data VLAN for the port having the registry of the "join" attribute or the "leave" attribute in the port attribute field 2230 is changed to the "non-blocked" state by the control of the ring protocol, no frame is forwarded from the port having registry of the "join" attribute in the port attribute field 2230 to the port having the "leave" attribute or from the port having the registry of the "leave" attribute in the port attribute field 2230 to the port having the "join" attribute.

Figure 11:
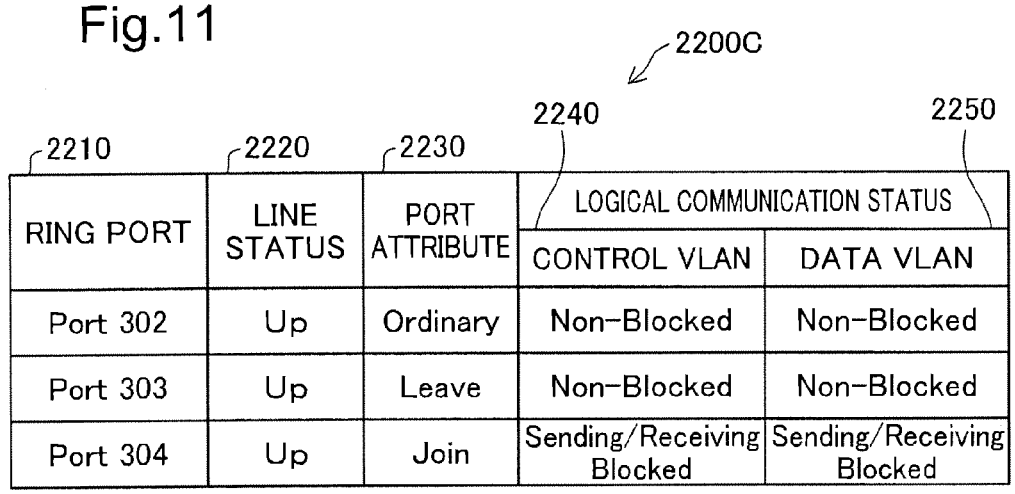
FIG. 11 is a diagram showing the contents of a ring port status table stored in the transit node.

FIG. 11 is a diagram showing the contents of the ring port status table 2200C stored in the transit node 300. As illustrated in FIG. 11, the ring port status table 2200C has the same fields as those of the ring port status table 2200A stored in the old master node 100. The meanings of the respective fields are identical with those of FIG. 9 and are not specifically described here. The following describes the specific settings registered in the respective fields of the ring port status table 2200C of FIG. 11.

In the transit node 300, "port 302", "port 303" and "port 304" are registered in the ring port field 2210. The port 301 is connected directly with the terminal 500 and is thereby exempt from the control of the ring protocol.

In the transit node 300, since the lines are ready for communication with the port 302 connected with the transit node 200, the port 303 connected with the old master node 100 and the port 304 connected with the new master node 110, "Up" is registered for all the "port 302", "port 303" and "port 304" in the line status field 2220.

In the transit node 300, the attribute "ordinary" is registered for the "port 302", the attribute "leave" is registered for the "port 303" and the attribute "join" is registered for the "port 304" in the port attribute field 2230. The "non-blocked" state is registered for the "port 302" and the "port 303" and the "sending/receiving blocked" state is registered for the "port 304" in the logical communication status field 2240 of the control VLAN in the transit node 300. The "non-blocked" state is registered for the "port 302" and the "port 303" and the "sending/receiving blocked" state is registered for the "port 304" by the control of the ring protocol in the logical communication status field 2250 of the data VLAN in the transit node 300.

FIG. 12 is a diagram showing the contents of the ring port status table 2200D stored in the new master node 110. As illustrated in FIG. 12, the ring port status table 2200D has the same fields as those of the ring port status table 2200A stored in the old master node 100. The meanings of the respective fields are identical with those of FIG. 9 and are not specifically described here. The following describes the specific settings registered in the respective fields of the ring port status table 2200D of FIG. 12.

In the new master node 110, "port 111" and "port 112" are registered in the ring port field 2210. In the new master node 110, since the lines are ready for communication with the port 111 connected with the transit node 200 and the port 112 connected with the transit node 300, "Up" is registered for both the "port 111" and the "port 112" in the line status field 2220.

In the new master node 110, the attribute "ordinary" is registered for both the "port 111" and the "port 112" in the port attribute field 2230. The "sending/receiving blocked" state is registered for both the "port 111" and the "port 112" by the same control as that of FIG. 9 in the logical communication status 2240 of the control VLAN in the new master node 110. The "sending/receiving blocked" state is registered as the default setting for both the "port 111" and the "port 112" in the logical communication status 2250 of the data VLAN in the new master node 110.

<FDB Table>

FIG. 13 is a diagram showing the contents of the FDB table 2300B stored in the transit node 200. The FDB table 2300B includes an FDB status table 2310 and a MAC address table 2320. The FDB status table 2310 is used to control the permission or the prohibition of learning the MAC address with respect to a received frame at each port in the VLAN and has a VLAN ID field 2311, a port number field 2312 and a learning status field 2313.

The VLAN ID 2311 field and the port number field 2312 have the registries extracted from the configuration table 2100. The VLAN IDs of the control VLAN and the data VLAN are registered in the VLAN ID field 2311, and the ports belonging to each of the VLANs are registered in the port number field 2312. The learning status field 2313 has the registry managed by the binary code, "normal" state meaning that learning of the MAC address is permitted and "learning prohibited" state meaning that learning of the MAC address is prohibited. The "normal" state is registered as the default setting for the respective ports in all the VLANs. In the transit node 200, the "normal" state is accordingly registered for all the ports included in all the VLANs in the learning status field 2313.

The MAC address table 2320 has a VLAN ID field 2321, a MAC address field 2322 and a port number field 2323 and adds an entry every time a frame is registered. In response to reception of a frame, the ring protocol processor 1000 registers the VLAN ID of the received frame in the VLAN ID field 2321, the source MAC address of the received frame in the MAC address field 2322 and the frame-receiving port in the port number field 2323. Each set of the VLAN ID, the MAC address and the port number forms each entry of the FDB.

When the combination of the VLAN ID and the destination MAC address of a received frame has been registered in the MAC address table 2320, the network device forwards the received frame only to the port registered in the port number field 2323 in correlation to the registered combination of the VLAN ID and the destination MAC address as the output destination port. When the combination of the VLAN ID and the destination MAC address of a received frame has not been registered in the MAC address table 2320, on the contrary, the network device refers to the ring port status table 2200 and forwards the received frame to all the ports having the registry of the "non-blocked" state as the logical communication status of the VLAN, except the frame-receiving port.

The user traffic U400 received in the transit node 200 is forwarded by the data VLAN, so that the ID "200" of the data VLAN is registered in the VLAN ID field 2321. The "terminal 400" as the source MAC address of the received user traffic U400 is registered in the MAC address field 2322. The "port 201" as the port that has received the user traffic U400 is registered in the port number field 2323.

The user traffic U500 is processed in a similar manner. The received user traffic U500 is forwarded by the data VLAN, so that the ID "200" of the data VLAN is registered in the VLAN ID field 2321. The "terminal 500" as the source MAC address of the received user traffic U500 is registered in the MAC address field 2322. The "port 202" as the port that has received the user traffic U500 is registered in the port number field 2323.

With reference to the registries of the MAC address table 2320 included in the FDB table 2300B, the transit node 200 forwards the user traffic, which is addressed to the terminal 400 as the destination MAC address, to the port 201, while forwarding the user traffic, which is addressed to the terminal 500 as the destination MAC address, to the port 202.

FIG. 14 is a diagram showing the contents of the FDB table 2300C stored in the transit node 300. Like the FDB table 2300B stored in the transit node 200, the FDB table 2300C includes an FDB status table 2310 and a MAC address table 2320. As illustrated in FIG. 14, the respective tables 2310 and 2320 of the FDB table 2300C have the same fields as those of the corresponding tables 2310 and 2320 of the FDB table 2300B stored in the transit node 200. The meanings of the respective fields are identical with those of FIG. 13 and are not specifically described here. The following describes the specific settings registered in the respective fields of the tables 2310 and 2320 of the FDB table 2300C shown in FIG. 14.

In the transit node 300, the "normal" state is registered for all the ports included in all the VLANs in the learning status field 2313 of the FDB status table 2310.

In the MAC address table 2320, the VLAN ID field 2321 shows the VLAN ID of the received user traffic U400. The received user traffic U400 is forwarded by the data VLAN, so that the ID "200" of the data VLAN is registered in the VLAN ID field 2321. The MAC address field 2322 shows the source MAC address of the received user traffic U400. Specifically, the "terminal 400" as the source MAC address of the received user traffic U400 is registered in the MAC address field 2322. The port number field 2323 shows the port number of the port that has received the user traffic U400. Specifically, the "port 302" as the port that has received the user traffic U400 is registered in the port number field 2323.

The user traffic U500 is processed in a similar manner. The received user traffic U500 is forwarded by the data VLAN, so that the ID "200" of the data VLAN is registered in the VLAN ID field 2321. The "terminal 500" as the source MAC address of the received user traffic U500 is registered in the MAC address field 2322. The "port 301" as the port that has received the user traffic U500 is registered in the port number field 2323.

With reference to the registries of the MAC address table 2320 included in the FDB table 2300C, the transit node 300 forwards the user traffic, which is addressed to the terminal 400 as the destination MAC address, to the port 302, while forwarding the user traffic, which is addressed to the terminal 500 as the destination MAC address, to the port 301.

The contents of the FDB tables stored in the old master node 100 and in the new master node 110 are not updated during the master node replacement operation and are thus not specifically described here.

D. Master Node Replacement Operation 1

The following describes master node replacement operations performed in the network system 10 according to the embodiment. Different master node replacement operations are employed in the case where the user traffic U400 or U500 is forwarded by the route that does not go through the master node 100 and in the case where the user traffic U400 or U500 is forwarded by the route that goes through the master node 100. The master node replacement operation in the former case is hereinafter referred to as "Master Node Replacement Operation 1" and is described below. The master node replacement operation in the latter case is hereinafter referred to as "Master Node Replacement Operation 2" and will be described later. The Master Node Replacement Operation 1 is performed through first to sixth phases.

<First Phase>

Figure 15:
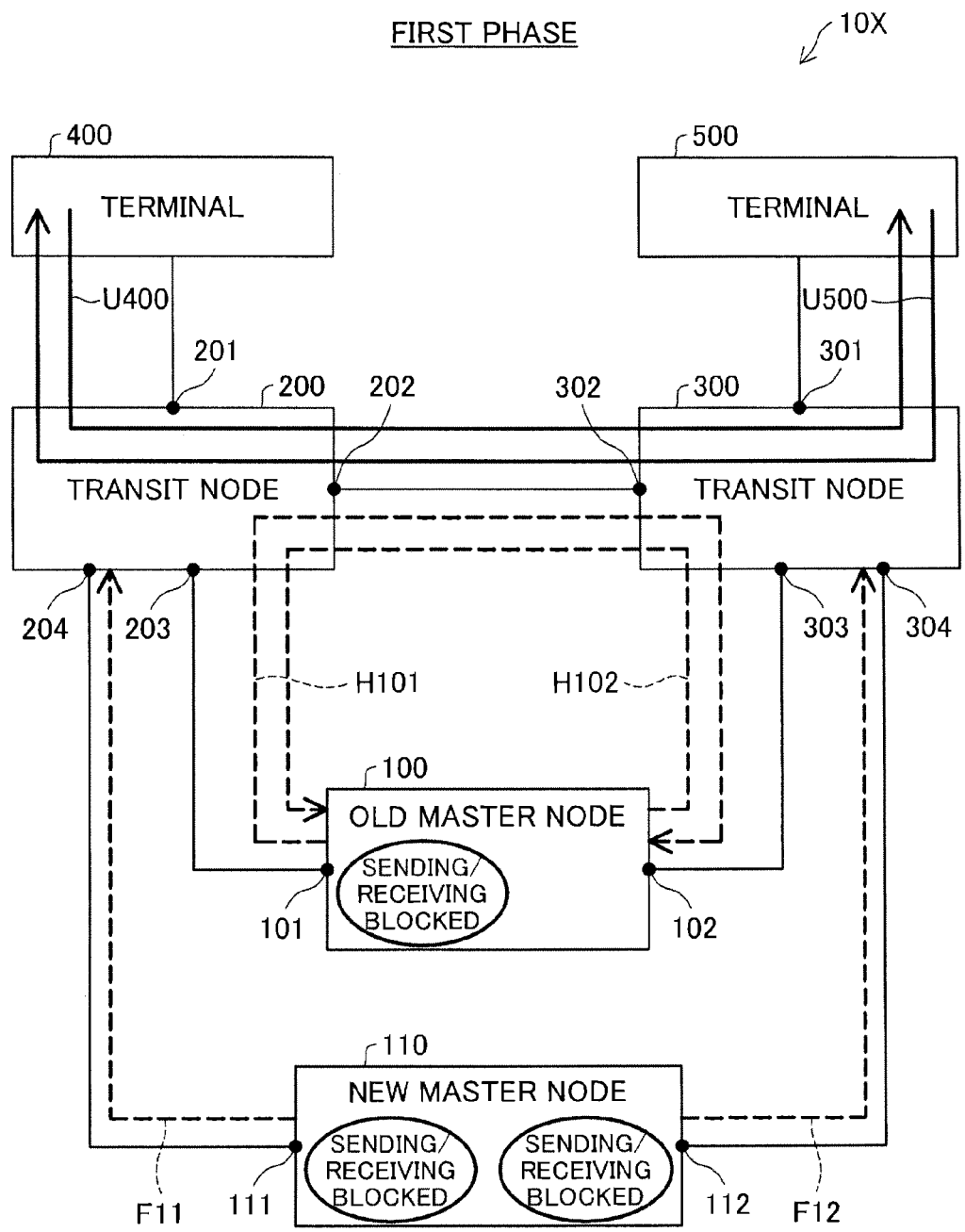
FIG. 15 is a diagram schematically illustrating the forwarding routes in the network system in a first phase of Master Node Replacement Operation 1.

FIG. 15 is a diagram schematically illustrating the forwarding routes in the network system 10X in the first phase of Master Node Replacement Operation 1. The first phase is the start of the master node replacement operation. As illustrated in FIG. 15, the network system 10X has the following operations as described previously with reference to FIG. 2:

i) The health check frame H101 sent from the port 101 of the old master node 100 goes through the transit node 200 and the transit node 300 and is returned to the port 102 of the old master node 100;

ii) The health check frame H102 sent from the port 102 of the old master node 100 goes through the transit node 300 and the transit node 200 and is returned to the port 101 of the old master node 100;

iii) The user traffic U400 sent by the first terminal 400 goes through the transit node 200 and the transit node 300 and reaches the second terminal 500; and iv) The user traffic U500 sent by the second terminal 500 goes through the transit node 300 and the transit node 200 and reaches the first terminal 400.

Additionally, the network system 10X has the following characteristic operations at the start of the master node replacement operation:

v) A monitor start notification frame F11 representing start of monitoring is sent from the port 111 of the new master node 110 to the control VLAN; and vi) A monitor start notification frame F12 is sent from the port 112 of the new master node 110 to the control VLAN.

Figure 16:
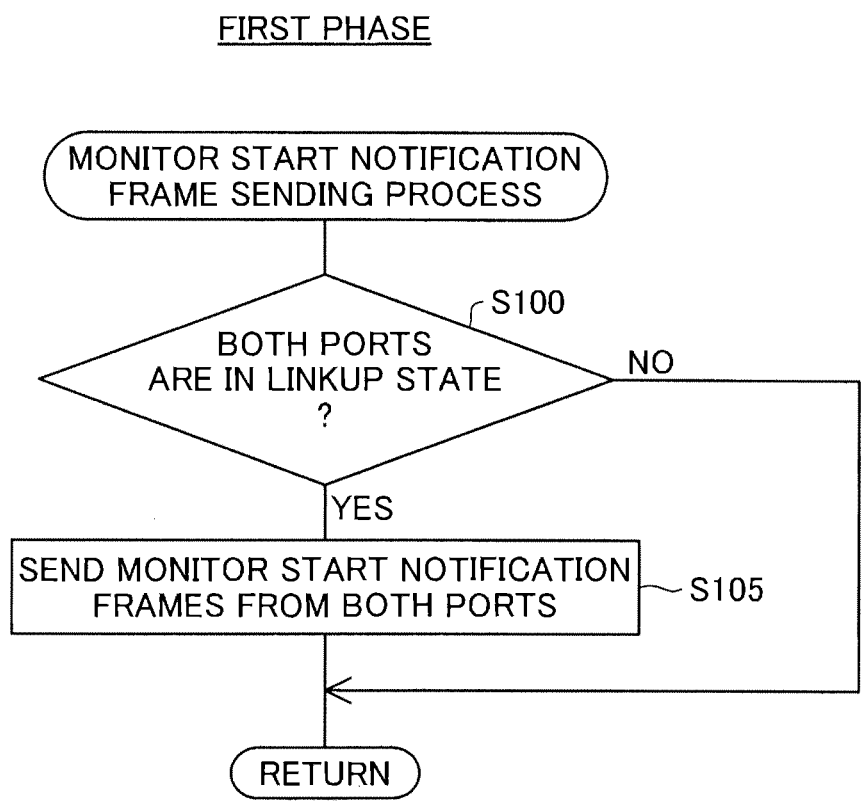
FIG. 16 is a flowchart showing a monitor start notification frame sending process performed by the new master node.

FIG. 16 is a flowchart showing a monitor start notification frame sending process performed by the new master node 110. This monitor start notification frame sending process is performed to implement the operations v) and vi) described above. The ring protocol processor 1000 included in each of the network devices 100, 200, 300 and 110 identifies whether its network device is assigned as the new master node 110 with reference to the node mode registered in the configuration table 2100. When its network device is identified as the new master node 110, the ring protocol processor 1000 repeatedly performs the monitor start notification frame sending process at preset time intervals or on every detection of linkup of the ring port.

In the monitor start notification frame sending process, the ring protocol processor 1000 first determines whether both the port 111 and the port 112 have been in the linkup state (step S100). The linkup state is detected from the registry of the line status field 2220 of the ring port status table 2200D (FIG. 12). More specifically, the ring protocol processor 1000 determines whether the registry in the line status field 2220 is "Up" for both the "port 111" and the "port 112" in the ring port status table 2200D.

When it is determined at step S100 that the "Up" state is registered for both the "port 111" and the "port 112", the ring protocol processor 1000 sends the monitor start notification frame F11 from the port 111 to the control VLAN, while sending the monitor start notification frame F12 from the port 112 to the control VLAN (step S105).

After step S105, the ring protocol processor 1000 goes to RETURN and terminates the monitor start notification frame sending process. When it is determined at step S100 that the "Up" state is not registered for both the "port 111" and the "port 112", i.e., when it is determined that "Down" state is registered for at least one of the "port 111" and the "port 112", on the other hand, the ring protocol processor 1000 immediately goes to RETURN without the processing of step S105. The processing of step S100 in the monitor start notification frame sending process corresponds to the function of the linkup detector 1100 (FIG. 4).

The monitor start notification frame F11 output from the port 111 of the new master node 110 is sent to the transit node 200, whilst the monitor start notification frame F12 output from the port 112 of the new master node 110 is sent to the transit node 300. Neither the transit node 200 nor the transit node 300, however, relays the monitor start notification frame.

<Second Phase>

The second phase is the phase immediately after the transit node 200 or 300 receives the monitor start notification frames F11 and F12.

Figure 17:
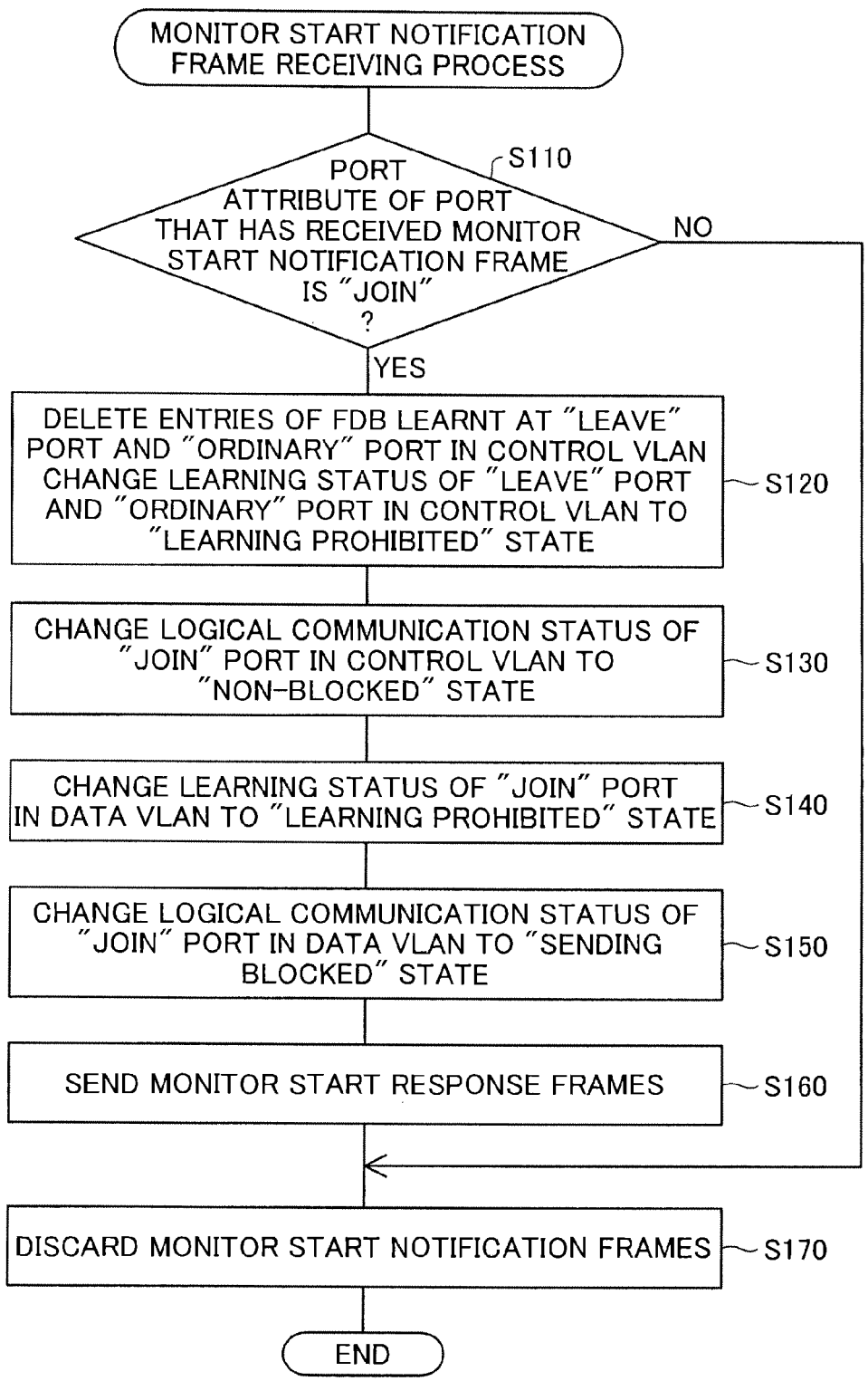
FIG. 17 is a flowchart showing a monitor start notification frame receiving process performed by the transit nodes.

FIG. 17 is a flowchart showing a monitor start notification frame receiving process performed by the transit nodes 200 and 300. The ring protocol processor 1000 included in each of the network devices 100, 200, 300 and 110 starts the monitor start notification frame receiving process, when receiving the monitor start notification frame F11 or F12 described above.

Since the network devices receiving the monitor start notification frames F11 and F12 are the transit nodes 200 and 300, the following description is on the assumption that the monitor start notification frame receiving process is performed by the transit nodes 200 and 300.

In the monitor start notification frame receiving process, the ring protocol processor 1000 first determines whether the port attribute of each port that has received the monitor start notification frame F11 or F12 is the "join" port (step S110). More specifically, the ring protocol processor 1000 refers to the registry in the port attribute field 2230 of the ring port status table 2200 (FIGS. 10 and 11) and determines whether the "join" port is registered in the port attribute field 2230 for the port that has received the monitor start notification frame F11 or F12.

When it is determined at step S110 that the registry in the port attribute field 2230 of the port that has received the monitor start notification frame F11 or F12 is the "join" port, the ring protocol processor 1000 goes to step S120. At step S120, the ring protocol processor 1000 searches the FDB status table 2310 included in the FDB table 2300 (FIGS. 13 and 14) for any entry with the combination of the VLAN ID of the control VLAN (i.e., ID "100") registered in the VLAN ID field 2311 and the port number of the "leave" port or the "ordinary" port registered in the port number field 2312 and changes the registry in the learning status field 2313 of the matching entry to the "learning prohibited" state. At step S120, the ring protocol processor 1000 also searches the MAC address table 2320 included in the FDB table 2300 (FIGS. 13 and 14) for any entry with the combination of the VLAN ID of the control VLAN (i.e., ID "100") registered in the VLAN ID field 2321 and the port number of the "leave" port or the "ordinary" port registered in the port number field 2323 and deletes the matching entry.

It is determined whether the port number registered in the port number field 2323 is the port number of the "leave" port or the "ordinary" port, with reference to the registry in the port attribute field 2230 of the ring port status table 2200 (FIGS. 10 and 11). At step S120, the ring protocol processor 1000 thus changes the learning status of the "leave" port and the "ordinary" port in the control VLAN to the "learning prohibited" state and deletes the entries of the FDB learnt at the "leave" port and the "ordinary" port.

The processing of step S120 is required when the health check frame is a unicast frame. The processing of step S120 may be omitted when the health check frame is not a unicast frame. The network system 10 of the embodiment employs a multicast frame as the health check frame, so that the processing of step S120 is not essential. According to this embodiment, however, the monitor start notification frame receiving process includes step S120 to be applicable to both the case where the health check frame is a unicast frame and the case where the health check frame is a multicast frame. The multicast frame is forwarded with no reference to the registry in the MAC address table. The entries of the FDB with respect to the control VLAN are thus omitted from the MAC address table 2320 (FIGS. 13 and 14).

The ring protocol processor 1000 subsequently changes the logical communication status of the control VLAN for the port that has received the monitor start notification frame F11 or F12, i.e., "join" port, to the "non-blocked" state (step S130). More specifically, the ring protocol processor 1000 searches the ring port status table 2200 (FIGS. 10 and 11) for any entry with the port that has received the monitor start notification frame F11 or F12 registered in the ring port field 2210 and changes the registry in the logical communication status field 2240 of the control VLAN of the matching entry to the "non-blocked" state.

The ring protocol processor 1000 subsequently searches the FDB status table 2310 included in the FDB table 2300 for any entry with the combination of the VLAN ID of the data VLAN (i.e., ID "200") registered in the VLAN ID field 2311 and the port number of the port that has received the monitor start notification frame F11 or F12, i.e., "join" port, registered in the port number field 2312 and changes the registry in the learning status field 2313 of the matching entry to the "learning prohibited" state (step S140).

The ring protocol processor 1000 then changes the logical communication status of the data VLAN for the port that has received the monitor start notification frame F11 or F12 to the "sending blocked" state (step S150). More specifically, the ring protocol processor 1000 searches the ring port status table 2200 (FIGS. 10 and 11) for any entry with the port that has received the monitor start notification frame F11 or F12, i.e., "join" port, registered in the ring port field 2210 and changes the registry in the logical communication status field 2250 of the data VLAN of the matching entry to the "sending blocked" state.

The ring protocol processor 1000 subsequently sends a monitor start response frame representing reception of the monitor start notification frame from each of the ports that have received the monitor start notification frames (step S160).

After step S160, the ring protocol processor 1000 goes to step S170 to discard the received monitor start notification frame without relaying to any other network device. When it is determined at step S110 that the registry in the port attribute field 2230 of the port that has received the monitor start notification frame F11 or F12 is not the "join" port, the ring protocol processor 1000 also goes to step S170 to discard the received monitor start notification frame. After step S170, the ring protocol processor 1000 terminates this monitor start notification frame receiving process.

The following describes how the contents of the ring port status tables 2200B and 2200C and the FDB tables 2300B and 2300C stored in the respective transit nodes 200 and 300 are changed by the monitor start notification frame receiving process described above.

FIG. 18 is a diagram showing the contents of the ring port status table 2200B stored in the transit node 200 after the monitor start notification frame receiving process. By the monitor start notification frame receiving process, the contents of the ring port status table 2200B change from the state of FIG. 10 to the state of FIG. 18. The processing of step S130 in FIG. 17 changes the registry in the logical communication status field 2240 of the control VLAN of the matching entry corresponding to the port 204 that has received the monitor start notification frame F11 to the "non-blocked" state (left hatched box). The processing of step S150 changes the registry in the logical communication status field 2250 of the data VLAN of the matching entry corresponding to the port 204 that has received the monitor start notification frame F11 to the "sending blocked" state (right hatched box).

FIG. 19 is a diagram showing the contents of the FDB status table 2310B stored in the transit node 200 after the monitor start notification frame receiving process. By the monitor start notification frame receiving process, the contents of the FDB status table 2310B change from the state of FIG. 13 to the state of FIG. 19. The processing of step S120 in FIG. 17 changes the registries in the learning status field 2313 of the matching entries corresponding to the combinations of the VLAN ID "100" with the "leave" port 203 and the "ordinary" port 202 to the "learning prohibited" state (upper two hatched boxes). The processing of step S140 changes the registry in the learning status field 2313 of the matching entry corresponding to the combination of the VLAN ID "200" with the "join" port 204 to the "learning prohibited" state (lower hatched box).

Figure 20:
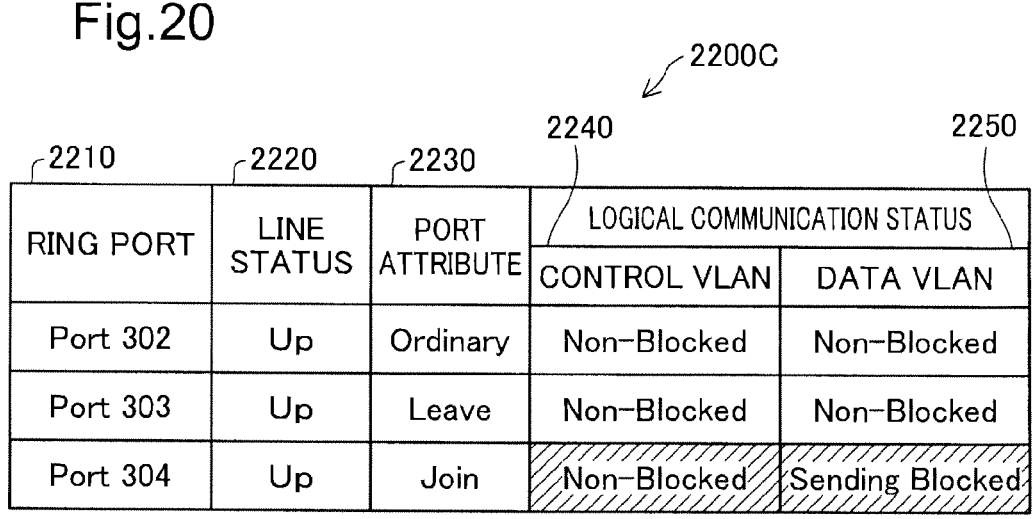
FIG. 20 is a diagram showing the contents of the ring port status table stored in the transit node after the monitor start notification frame receiving process.

FIG. 20 is a diagram showing the contents of the ring port status table 2200C stored in the transit node 300 after the monitor start notification frame receiving process. By the monitor start notification frame receiving process, the contents of the ring port status table 2200C change from the state of FIG. 11 to the state of FIG. 20. The processing of step S130 in FIG. 17 changes the registry in the logical communication status field 2240 of the control VLAN of the matching entry corresponding to the port 304 that has received the monitor start notification frame F12 to the "non-blocked" state (left hatched box). The processing of step S150 changes the registry in the logical communication status field 2250 of the data VLAN of the matching entry corresponding to the port 304 that has received the monitor start notification frame F12 to the "sending blocked" state (right hatched box).

Figure 21:
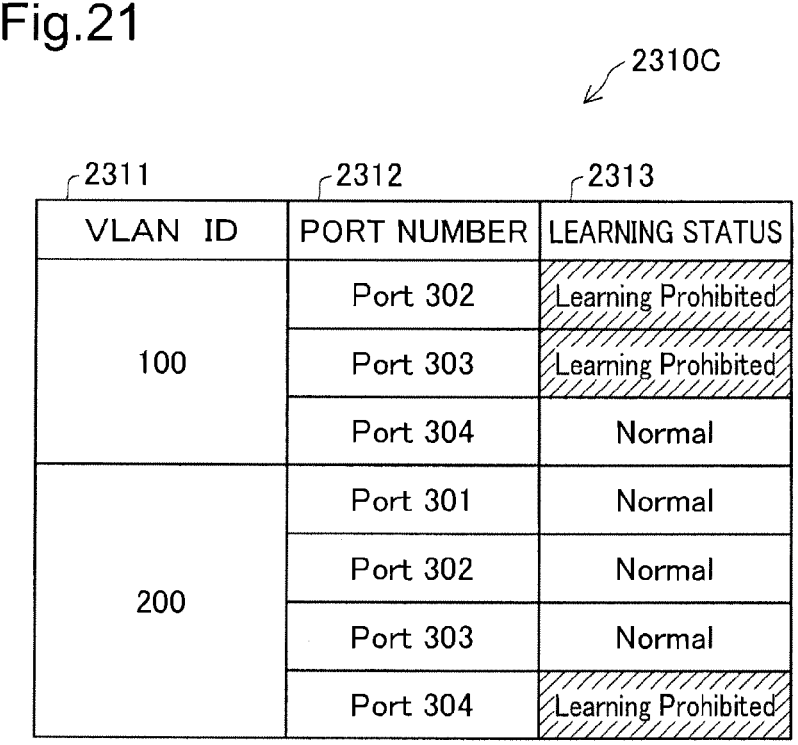
FIG. 21 is a diagram showing the contents of an FDB status table stored in the transit node after the monitor start notification frame receiving process.

FIG. 21 is a diagram showing the contents of the FDB status table 2310C stored in the transit node 300 after the monitor start notification frame receiving process. By the monitor start notification frame receiving process, the contents of the FDB status table 2310C change from the state of FIG. 14 to the state of FIG. 21. The processing of step S120 in FIG. 17 changes the registries in the learning status field 2313 of the matching entries corresponding to the combinations of the VLAN ID "100" with the "leave" port 303 and the "ordinary" port 302 to the "learning prohibited" state (upper two hatched boxes). The processing of step S140 changes the registry in the learning status field 2313 of the matching entry corresponding to the combination of the VLAN ID "200" with the "join" port 304 to the "learning prohibited" state (lower hatched box).

Figure 22:
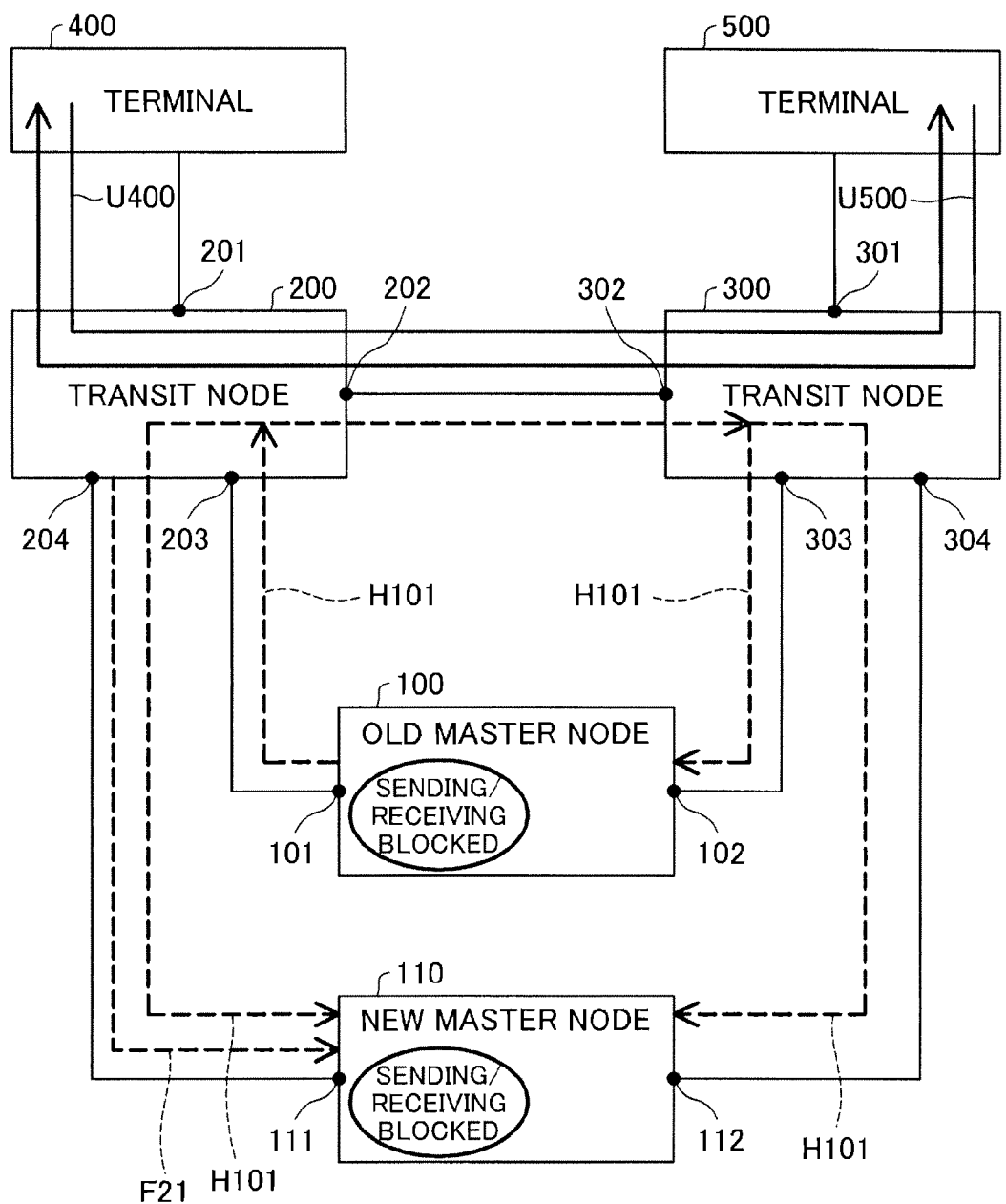
FIG. 22 is a diagram schematically illustrating the forwarding routes in the network system in a second phase, part 1 of Master Node Replacement Operation 1.
Figure 23:
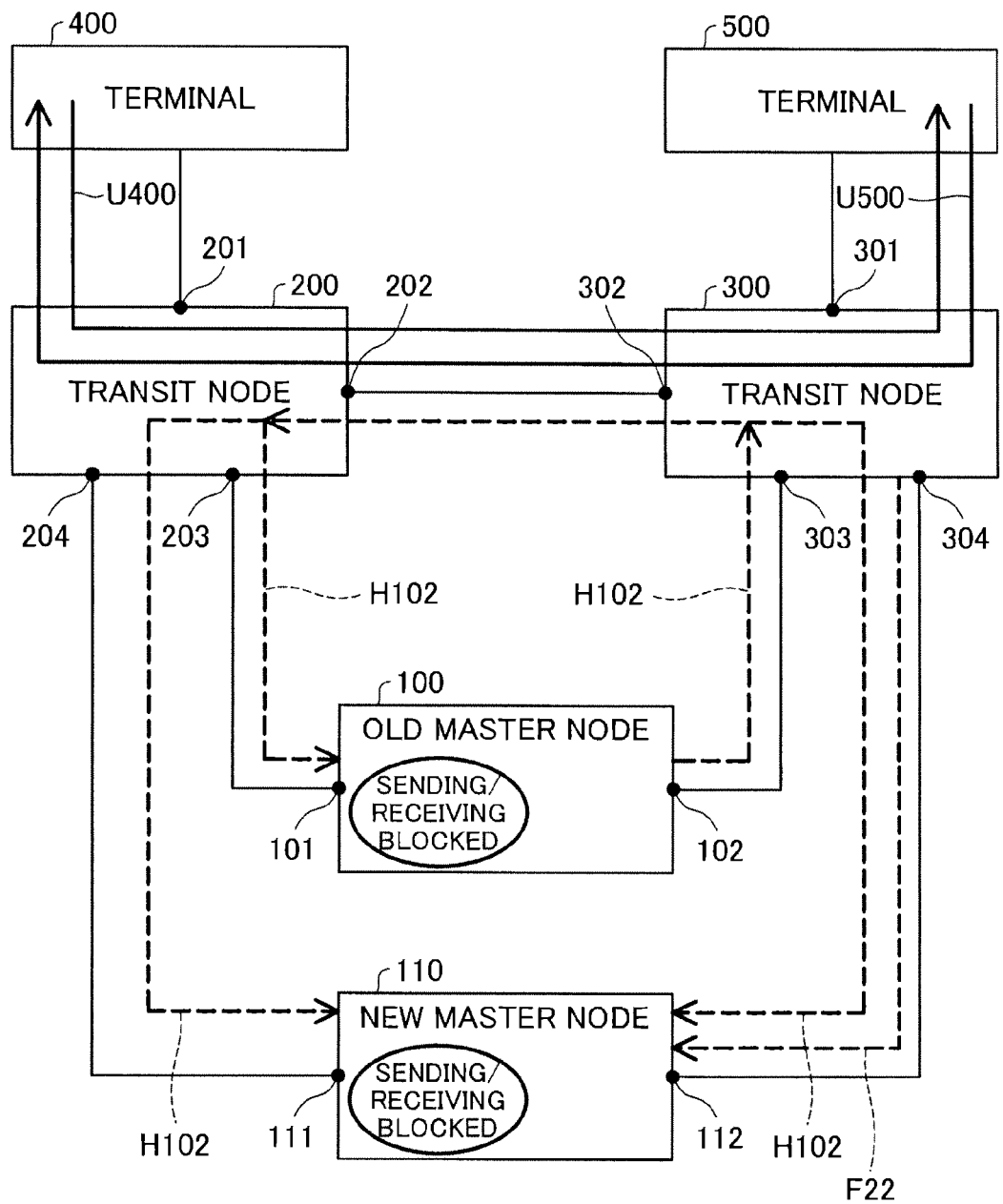
FIG. 23 is a diagram schematically illustrating the forwarding routes in the network system in the second phase, part 2 of Master Node Replacement Operation 1.

FIGS. 22 and 23 are diagrams schematically illustrating the forwarding routes in the network system 10X in the second phase of Master Node Replacement Operation 1. As illustrated in FIG. 22, when receiving the monitor start notification frame F11 (FIG. 15), the transit node 200 sends a monitor start response frame F21 from the port 204 that has received the monitor start notification frame F11 (step S160 in FIG. 17). The new master node 110 receives the monitor start response frame F21 but does not relay the monitor start response frame F21.

Although not being specifically illustrated in the form of a flowchart, when receiving a health check frame, the ring protocol processor 1000 included in the network device refers to the ring port status table 2200 and forwards the received health check frame to any port having the registry of "non-blocked" state in the logical communication status field 2240 of the control VLAN among all the ports other than the frame-receiving port. More specifically, when receiving the health check frame 11101 at the port 203, the transit node 200 refers to the ring port status table 2200B (FIG. 18) and forwards the received health check frame H101 to the ports 202 and 204 having the registry of "non-blocked" state in the logical communication status field 2240 of the control VLAN among all the ports other than the frame-receiving port 203. The logical communication status of the port 204 has been changed to the "non-blocked" state by the processing of step S130 in FIG. 17. As a result of such forwarding, the health check frame H101 is sent from the transit node 200 to both the new master node 110 and the transit node 300.

When receiving the health check frame H101 at the port 302, the transit node 300 refers to the ring port status table 2200C (FIG. 20) and forwards the received health check frame H101 to the ports 303 and 304 having the registry of "non-blocked" state in the logical communication status field 2240 of the control VLAN among all the ports other than the frame-receiving port 302. As a result of such forwarding, the health check frame H101 is sent from the transit node 300 to both the old master node 100 and the new master node 110.

As illustrated in FIG. 23, on the other hand, when receiving the monitor start notification frame F12 (FIG. 15), the transit node 300 sends a monitor start response frame F22 from the port 304 that has received the monitor start notification frame F12 (step S160 in FIG. 17). The new master node 110 receives the monitor start response frame F22 but does not relay the monitor start response frame F22.

When receiving the health check frame H102 at the port 303, the transit node 300 refers to the ring port status table 2200C (FIG. 20) and forwards the received health check frame H102 to the ports 302 and 304 having the registry of "non-blocked" state in the logical communication status field 2240 of the control VLAN among all the ports other than the frame-receiving port 303. The logical communication status of the port 304 has been changed to the "non-blocked" state by the processing of step S130 in FIG. 17. As a result of such forwarding, the health check frame H102 is sent from the transit node 300 to both the new master node 110 and the transit node 200.

When receiving the health check frame H102 at the port 202, the transit node 200 refers to the ring port status table 2200B (FIG. 18) and forwards the received health check frame H102 to the ports 203 and 204 having the registry of "non-blocked" state in the logical communication status field 2240 of the control VLAN among all the ports other than the frame-receiving port 202. As a result of such forwarding, the health check frame H102 is sent from the transit node 200 to both the old master node 100 and the new master node 110.

The flows of the respective signals shown in FIG. 22 and the flows of the respective signals shown in FIG. 23 are guaranteed after the new master node 110 receives the monitor start response frames at both the ports 111 and 112 that have sent the monitor start notification frames. The new master node 110 checks all the health check frame H101 received at the port 111, the health check frame H101 received at the port 112, the health check frame H102 received at the port 111, and the health check frame H102 received at the port 112.

The health check frame H101 received at the port 111 and the health check frame H102 received at the port 112 are the health check frames directly forwarded from the "leave" port to the "join" port and are used to check whether the old master node 100 has sent the health check frames. The function of checking whether the old master node has sent the health check frames is hereinafter referred to as "transmission monitoring".

The health check frame H101 received at the port 112 and the health check frame H102 received at the port 111 are the health check frames directly forwarded from the "ordinary" port to the "join" port and are used to check the successful reach of the health check frame, i.e., whether the health check frame sent by the old master node 100 goes around the ring network. The function of checking the normality of the ring network is hereinafter referred to as "reception monitoring".

The health check frame for transmission monitoring is distinguishable from the health check frame for reception monitoring by the source MAC address included in the health check frame. More specifically, the health check frame for transmission monitoring and the health check frame for reception monitoring are differentiated from each other by checking the source MAC address of the health check frame against the contents of the configuration table 2100.

The new master node 110 determines the registry of the logical communication status field 2250 of the data VLAN, based on the health check frames for reception monitoring, i.e., the health check frame H101 received at the port 112 and the health check frame H102 received at the port 111. When both the health check frames H101 and H102 for reception monitoring are receivable, the new master node 110 sets the "sending/receiving blocked" state in the logical communication status field 2250 of the data VLAN with respect to one of the ports that have received the health check frames H101 and H102 for reception monitoring. This avoids the routing loop of user traffic in the ring network.

When both the health check frames H101 and H102 for reception monitoring are not receivable, the new master node 110 detects the occurrence of a failure in the ring network and sets the "non-blocked" state in the logical communication status field 2250 of the data VLAN. This enables communication through a separately provided alternative route. In the illustrated example of FIGS. 22 and 23, since both the health check frames H101 and H102 for reception monitoring are receivable, the logical communication status of the data VLAN for the port 111 is set to the "sending/receiving blocked" state.

As a result, in the second phase, the new master node 110 monitors all the health check frames H101 and H102 for reception monitoring and thereby implements the monitor function of the ring network equivalent to that of the old master node 100. This function of monitoring the ring network by receiving the health check frames H101 and H102 for reception monitoring corresponds to the replacement-time monitor 1300 (FIG. 4). In this second phase, as well as the third phase and the fourth phase described above, the new master node 110 does not send a health check frame independently.

The processing of step S130 in FIG. 17 described above corresponds to the forwarding instructor 1200 (FIG. 4). More specifically, the processing of step S130 to give instructions to the control VLAN to trigger transmission monitoring and reception monitoring implements the function of the forwarding instructor 1200 (FIG. 4). As described previously, the network system 10 of the embodiment employs the multicast frame as the health check frame, so that the health check frames H101 and H102 for reception monitoring are checked by both the old master node 100 and the new master node 110. In another application using the unicast frame, the processing of step S120 in FIG. 17 described above enables the health check frames H101 and H102 for reception monitoring to be checked by both the old master node 100 and the new master node 110 by flooding, as in the case of the multicast frame.

Now consideration is made on the health check frame H102 sent from the ring port 102 of the old master node 100. As described previously with reference to FIG. 23, the health check frame H102 is output from the ring port 102 and is sequentially forwarded through the transit node 300 and the transit node 200 and is sent to the ring port 111 of the new master node 110 as the health check frame for reception monitoring. In this case, the transit node 200 corresponds to the "first adjacent network device" in the first aspect of the invention described in SUMMARY, and the transit node 300 corresponds to the "second adjacent network device" in the first aspect of the invention described in SUMMARY.

<Third Phase>

The third phase is the phase immediately after the new master node 110 receives the monitor start response frames F21 and F22.

Figure 24:
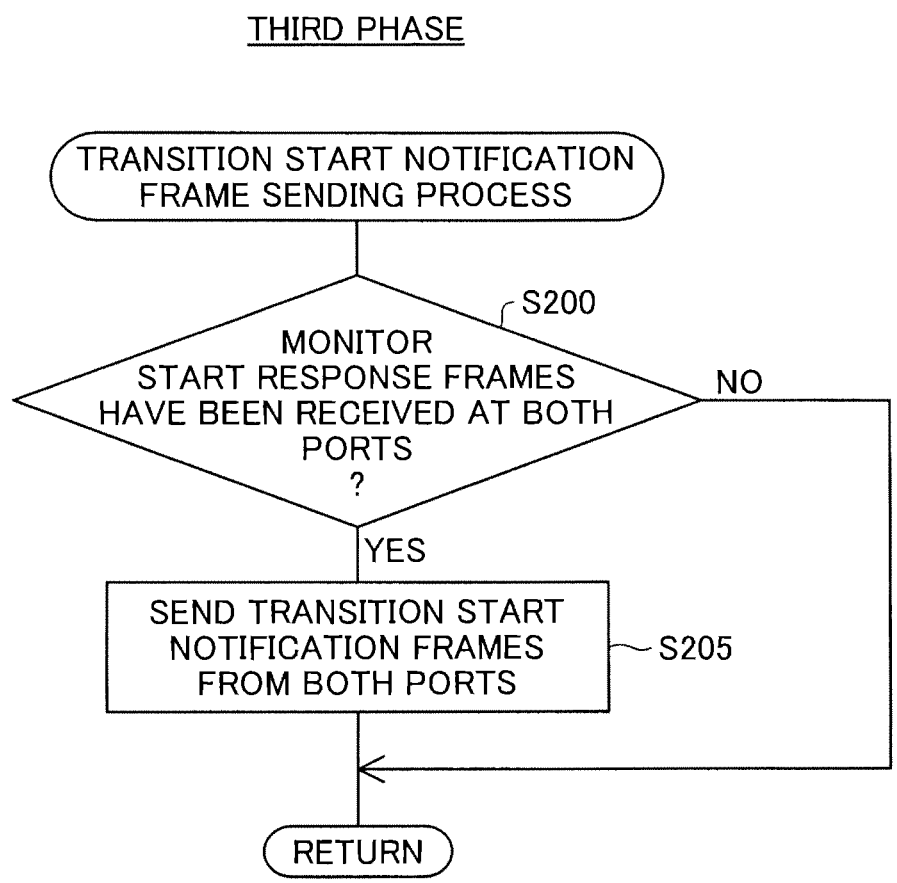
FIG. 24 is a flowchart showing a transition start notification frame sending process performed by the new master node.

FIG. 24 is a flowchart showing a transition start notification frame sending process performed by the new master node 110. The ring protocol processor 1000 included in each of the network devices 100, 200, 300 and 110 identifies whether its network device is assigned as the new master node 110 with reference to the node mode registered in the configuration table 2100. When its network device is identified as the new master node 110, the ring protocol processor 1000 repeatedly performs the transition start notification frame sending process at preset time intervals or on every reception of the monitor start response frame.

In the transition start notification frame sending process, the ring protocol processor 1000 included in the new master node 110 first determines whether the monitor start response frames F21 and F22 have been received at both the ports 111 and 112 (step S200).

When it is determined at step S200 that the monitor start response frames F21 and F22 have been received at both the ports 111 and 112, the ring protocol processor 1000 sends a transition start notification frame F31 from the port 111 to the control VLAN, while sending a transition start notification frame F32 from the port 112 to the control VLAN (step S205).

After step S205, the ring protocol processor 1000 goes to RETURN and terminates the transition start notification frame sending process. When a negative answer is given at step S200, i.e., when at least one of the ports 111 and 112 has failed to receive the monitor start response frames F21 and F22, on the other hand, the ring protocol processor 1000 immediately goes to RETURN without the processing of step S205.

Figure 25:
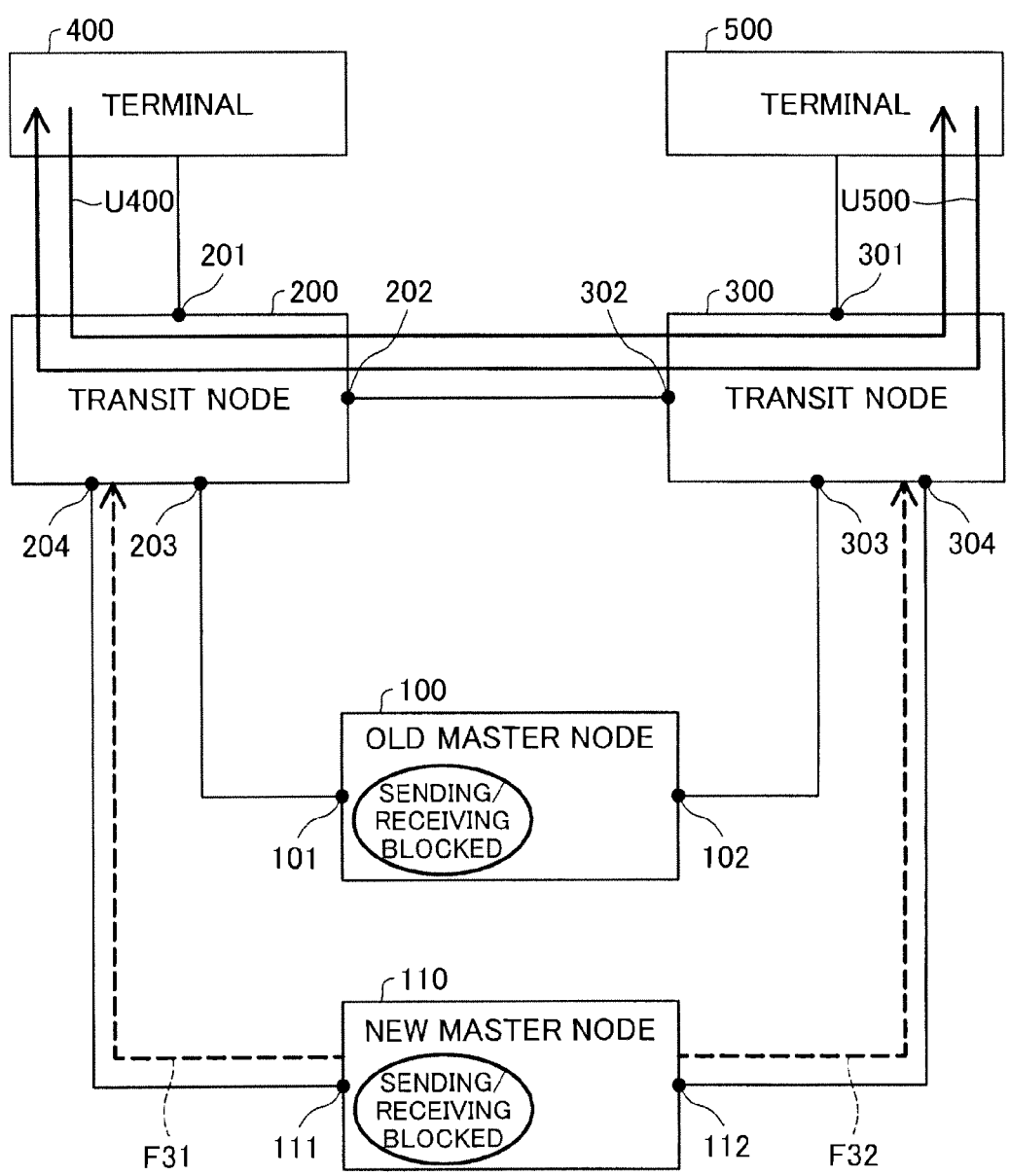
FIG. 25 is a diagram schematically illustrating the forwarding routes in the network system in a third phase of Master Node Replacement Operation 1.

FIG. 25 is a diagram schematically illustrating the forwarding routes in the network system 10X in the third phase of Master Node Replacement Operation 1. As illustrated in FIG. 25, the new master node 110 sends the transition start notification frame F31 from the port 111, while sending the transition start notification frame F32 from the port 112 (step S205 in FIG. 24). The transit nodes 200 and 300 adjacent to the new master node 110 receive the transition start notification frames F31 and F32 but do not relay the received transition start notification frames F31 and F32. The forwarding routes of the health check frames are identical with those of FIGS. 22 and 23 and are thus omitted from the illustration of FIG. 25.

<Fourth Phase>

The fourth phase is the phase immediately after the transit nodes 200 and 300 receive the transition start notification frames F31 and F32.

Figure 26:
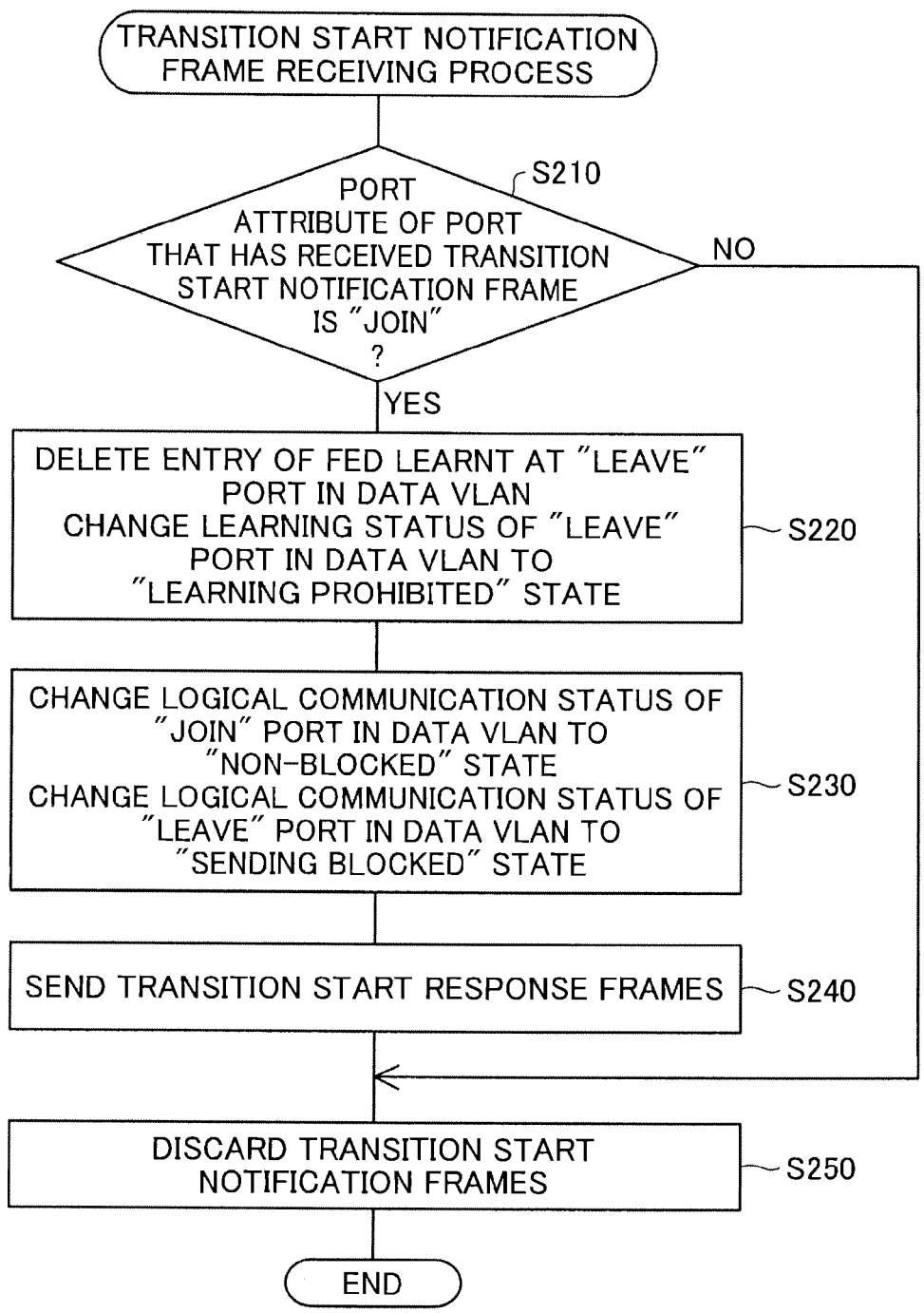
FIG. 26 is a flowchart showing a transition start notification frame receiving process performed by the transit nodes.

FIG. 26 is a flowchart showing a transition start notification frame receiving process performed by the transit nodes 200 and 300. The ring protocol processor 1000 included in each of the network devices 100, 200, 300 and 110 starts the transition start notification frame receiving process, when receiving the transition start notification frame F31 or F32 described above. Since the network devices receiving the transition start notification frames F31 and F32 are the transit nodes 200 and 300, the following description is on the assumption that the transition start notification frame receiving process is performed by the transit nodes 200 and 300.

In the transition start notification frame receiving process, the ring protocol processor 1000 first determines whether the port attribute of each port that has received the transition start notification frame F31 or F32 is the "join" port (step S210). More specifically, the ring protocol processor 1000 refers to the registry in the port attribute field 2230 of the ring port status table 2200 (FIGS. 10 and 11) and determines whether the "join" port is registered in the port attribute field 2230 for the port that has received the transit start notification frame F31 or F32.

When it is determined at step S210 that the registry in the port attribute field 2230 of the port that has received the transition start notification frame F31 or F32 is the "join" port, the ring protocol processor 1000 goes to steps S220 and S230. The processing of step S220 is related to the data VLAN of the line connected with the old master node 100, and the processing of step S230 is related to the data VLAN of the line connected with the new master node 110. In Master Node Replacement Operation 1 described herein, since the user traffic is forwarded by the route that does not go through the master node, the processing of steps S220 and S230 is not necessary. The processing of steps S220 and S230 is effective for Master Node Replacement Operation 2, in which the user traffic is forwarded by the route that goes through the master node. The details of steps S220 and S230 are accordingly described later in Master Node Replacement Operation 2.

After step S230, the ring protocol processor 1000 sends a transition start response frame representing reception of the transition start notification frame F31 or F32 from each of the ports that have received the transition start notification frames F31 and F32 (step S240).

After step S240, the ring protocol processor 1000 goes to step S250 to discard the received transition start notification frame F31 or F32 without relaying to any other network device. When it is determined at step S210 that the registry in the port attribute field 2230 of the port that has received the transition start notification frame F31 or F32 is not the "join" port, the ring protocol processor 1000 also goes to step S250 to discard the received transition start notification frame F31 or F32. After step S250, the ring protocol processor 1000 terminates this transition start notification frame receiving process.

Figure 27:
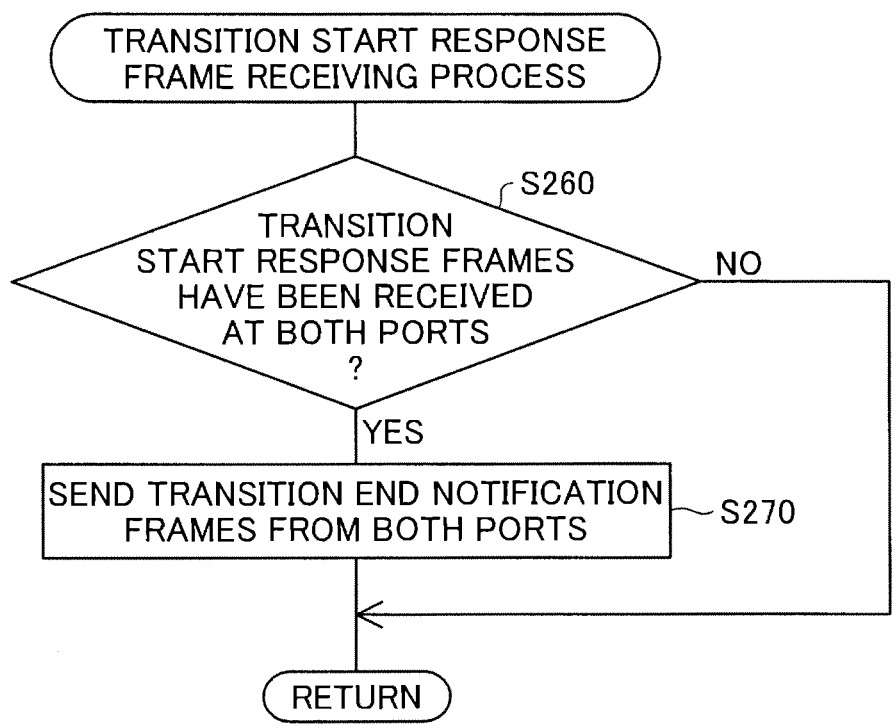
FIG. 27 is a flowchart showing a transition start response frame receiving process performed by the new master node.

FIG. 27 is a flowchart showing a transition start response frame receiving process performed by the new master node 110. The ring protocol processor 1000 included in each of the network devices 100, 200, 300 and 110 identifies whether its network device is assigned as the new master node 110 with reference to the node mode registered in the configuration table 2100. When its network device is identified as the new master node 110, the ring protocol processor 1000 repeatedly performs the transition start response frame receiving process at preset time intervals or on every reception of the transition start response frame.

In the transition start response frame receiving process, the ring protocol processor 1000 included in the new master node 110 first determines whether the transition start response frames have been received at both the ports 111 and 112 (step S260).

When it is determined at step S260 that the transition start response frames have been received at both the ports 111 and 112, the ring protocol processor 1000 sends transition end notification frames from these response frame-receiving ports 111 and 112 to the control VLAN (step S270).

After step S270, the ring protocol processor 1000 goes to RETURN and terminates the transition start response frame receiving process. When a negative answer is given at step S260, i.e., when at least one of the ports 111 and 112 has failed to receive the transition start response frame, on the other hand, the ring protocol processor 1000 immediately goes to RETURN without the processing of step S270.

Figure 28:
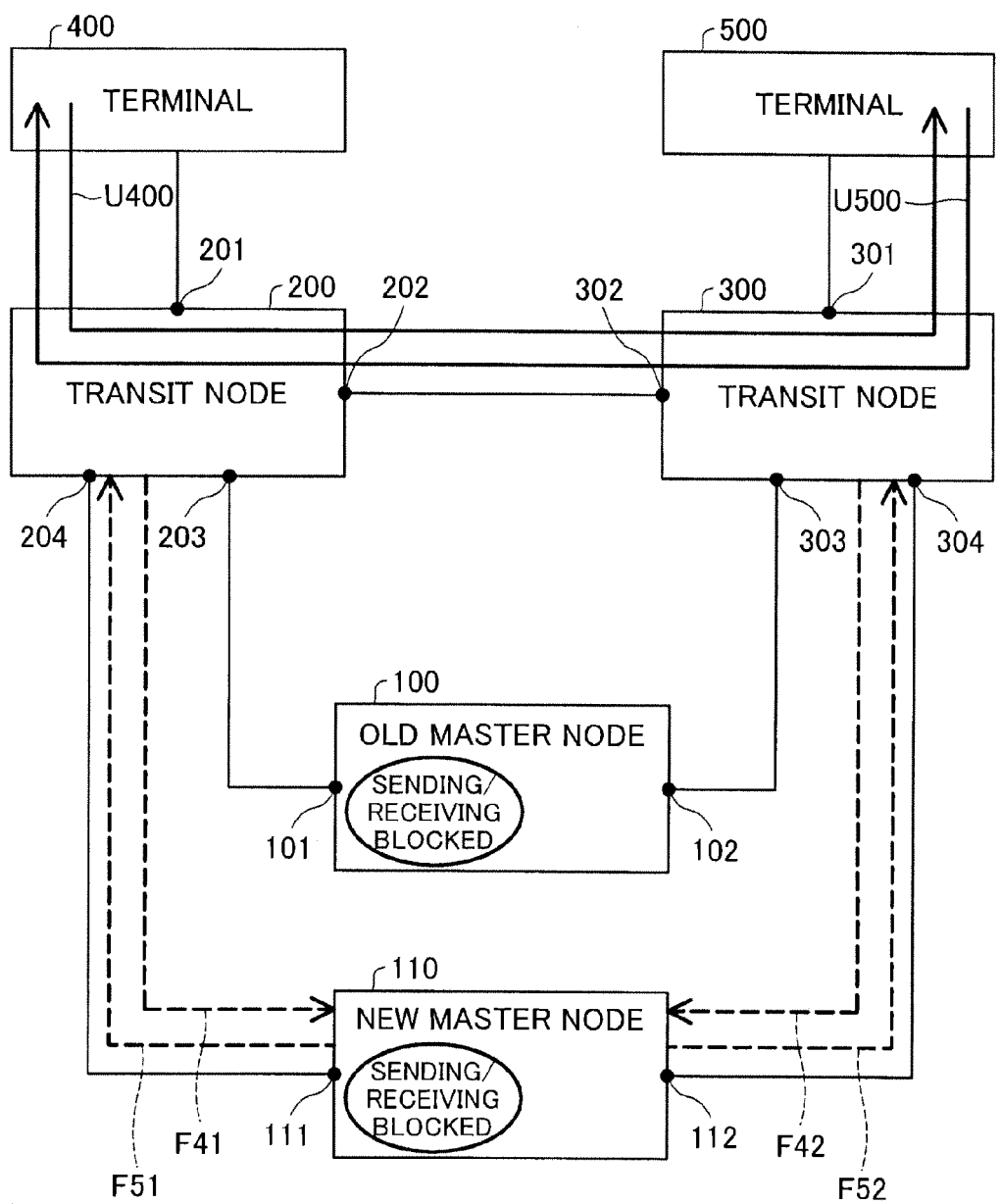
FIG. 28 is a diagram schematically illustrating the forwarding routes in the network system in a fourth phase of Master Node Replacement Operation 1.

FIG. 28 is a diagram schematically illustrating the forwarding routes in the network system 10X in the fourth phase of Master Node Replacement Operation 1. As illustrated in FIG. 28, the transit node 200 sends a transition start response frame F41 from the port 204, whilst the transit node 300 sends a transition start response frame F42 from the port 304 (step S240 in FIG. 26). The new master node 110 sends a transition end notification frame F51 from the port 111, while sending a transition end notification frame F52 from the port 112 (step S270 in FIG. 27). The transit nodes 200 and 300 adjacent to the new master node 110 receive the transition end notification frames F51 and F52 but do not relay the received transition end notification frames F51 and F52. The forwarding routes of the health check frames are identical with those of FIGS. 22 and 23 and are thus omitted from the illustration of FIG. 28.

<Fifth Phase>

The fifth phase is the phase immediately after the transit nodes 200 and 300 receive the transition end notification frames F51 and F52.

Figure 29:
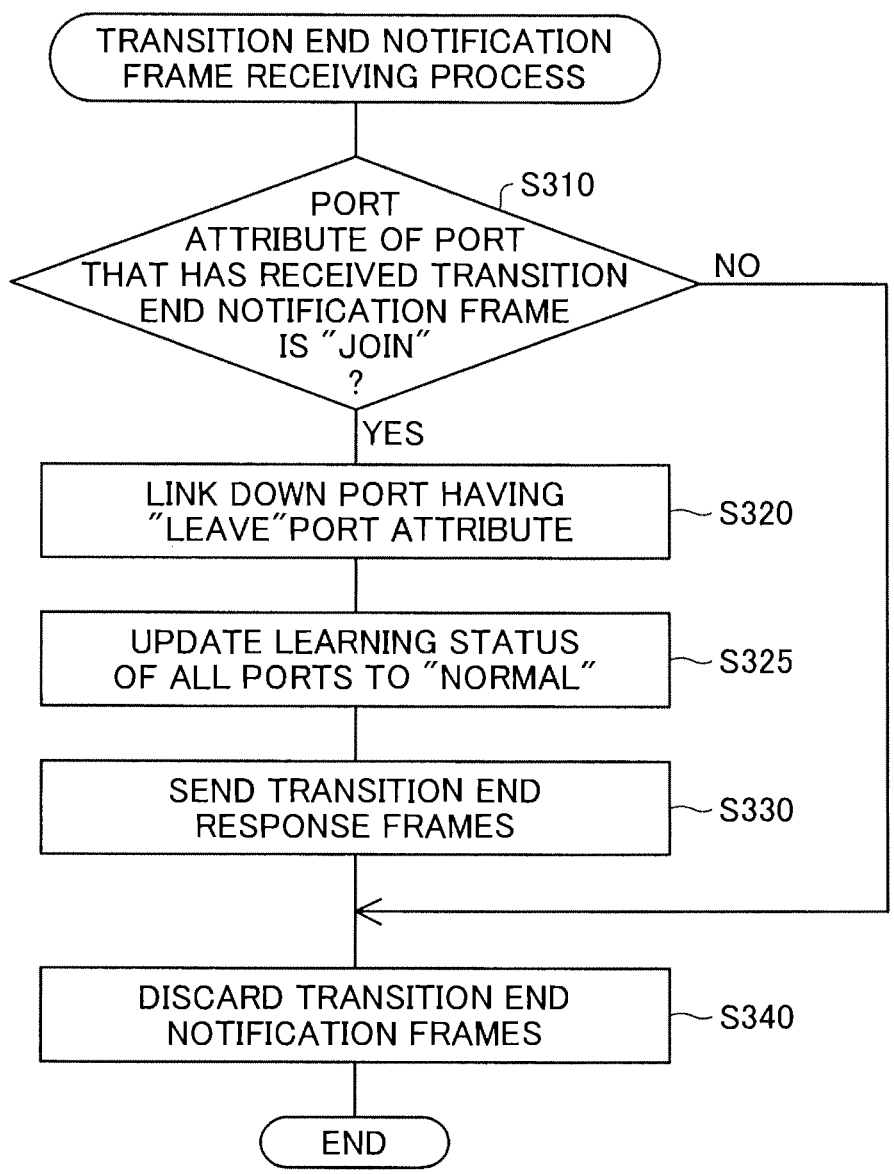
FIG. 29 is a flowchart showing a transition end notification frame receiving process performed by the transit nodes.

FIG. 29 is a flowchart showing a transition end notification frame receiving process performed by the transit nodes 200 and 300. The ring protocol processor 1000 included in each of the network devices 100, 200, 300 and 110 starts the transition end notification frame receiving process, when receiving the transition end notification frame F51 or F52 described above. Since the network devices receiving the transition end notification frames F51 and F52 are the transit nodes 200 and 300, the following description is on the assumption that the transition end notification frame receiving process is performed by the transit nodes 200 and 300.

In the transition end notification frame receiving process, the ring protocol processor 1000 first determines whether the port attribute of each port that has received the transition end notification frame F51 or F52 is the "join" port (step S310). More specifically, the ring protocol processor 1000 refers to the registry in the port attribute field 2230 of the ring port status table 2200 (FIGS. 10 and 11) and determines whether the "join" port is registered in the port attribute field 2230 for the port that has received the transit end notification frame F51 or F52.

When it is determined at step S310 that the registry in the port attribute field 2230 of the port that has received the transition end notification frame F51 or F52 is the "join" port, the ring protocol processor 1000 links down the port having the registry of the "leave" attribute in the port attribute field 2230 of the link port status table 2200 (step S320) and updates the registries in the learning status field 2313 of all the ports in the FDB status table 2310 to "normal" (step S325). The ring protocol processor 1000 subsequently sends a transition end response frame representing reception of the transition end notification frame F51 or F52 from each of the ports that have received the transition end notification frames F51 and F52 (step S330). The "link down" at step S320 means changing to the incommunicable state.

After step S330, the ring protocol processor 1000 goes to step S340 to discard the received transition end notification frame F51 or F52 without relaying to any other network device. When it is determined at step S310 that the registry in the port attribute field 2230 of the port that has received the transition end notification frame F51 or F52 is not the "join" port, the ring protocol processor 1000 also goes to step S340 to discard the received transition end notification frame F51 or F52. After step S340, the ring protocol processor 1000 terminates this transition end notification frame receiving process.

Figure 30:
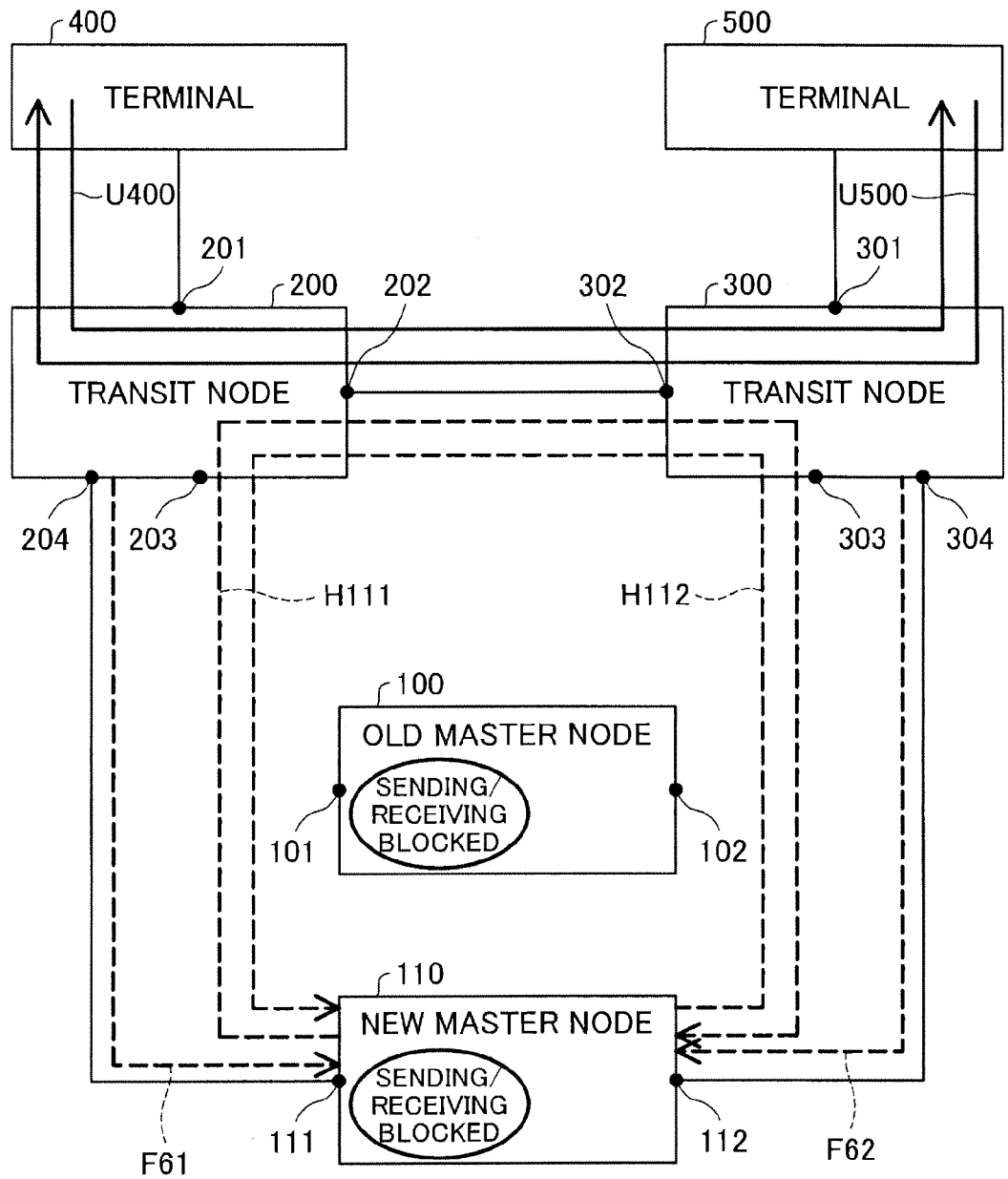
FIG. 30 is a diagram schematically illustrating the forwarding routes in the network system in a fifth phase of Master Node Replacement Operation 1.

FIG. 30 is a diagram schematically illustrating the forwarding routes in the network system 10 in the fifth phase of Master Node Replacement Operation 1. As illustrated in FIG. 30, the transit node 200 sends a transition end response frame F61 from the port 204, whilst the transit node 300 sends a transition end response frame F62 from the port 304 (step S330 in FIG. 29).

The new master node 110 receives the transition end response frames F61 and F62 at the ports 111 and 112 that have respectively sent the transition end notification frames F51 and F52. On condition that the transition end response frames F61 and F62 are received, the new master node 110 starts sending health check frames H111 and H112. The health check frame H111 goes around the ring network in the network system 10 (hereinafter this is referred to as "network system 10Y", in order to distinguish from the network system 10 before replacement of the master node and the network system 10X during replacement of the master node), i.e., through the new master node 110, the transit node 200, the transit node 300 and the new master node 110. The health check frame H112 goes around the ring network, i.e., through the new master node 110, the transit node 300, the transit node 200 and the new master node 110.

According to this embodiment, the new master node 110 also starts sending the health check frames H111 and H112 on condition that the health check frame H101 for transmission monitoring sent from the old master node 100 is not received at the port 111 and that the health check frame H102 for transmission monitoring sent from the old master node 100 is not received at the port 111. Transmission of the health check frames H111 and H112 accordingly starts when at least one of these two conditions is satisfied.

<Sixth Phase>

The sixth phase is the last phase of Master Node Replacement Operation 1 and includes the following operations (a) to (c):

(a) The transit nodes 200 and 300 respectively search the ring port status tables 2200B and 2200C (FIGS. 10 and 11) for any entries with the registry of the "leave" port in the port attribute field 2230 and delete the matching entries of the "leave" port from the configuration tables 2100B and 2100C (FIGS. 6 and 7);

(b) The transit nodes 200 and 300 respectively change the registries in the port attribute field 2230 of the "join" port to "ordinary" in the ring port status tables 2200B and 2200C; and (c) The new master node 110 changes the node mode from "new master node" to "master node" in the configuration table 2100D.

After these series of operations, all the procedure of Master Node Replacement Operation 1 is completed. When the node mode of the new master node 110 is changed from "new master node" to "master node" in the configuration table 2100D, the logical communication statuses of the new master node 110 at the moment are registered in the logical communication status field 2240 of the control VLAN and the logical communication status field 2250 of the data VLAN in the ring port status table 2200D. The network cable for the old master node 100 should be detached after this sixth phase.

E. Master Node Replacement Operation 2

The Master Node Replacement Operation 2 is performed in the case where user traffics U402 and U502 are forwarded by the route that goes through the master node. The processing flows of FIGS. 16, 17, 24, 26 27 and 29 performed by the ring protocol processor 1000 in Master Node Replacement Operation 1 are similarly performed in Master Node Replacement Operation 2.

<First Phase>

Figure 31:
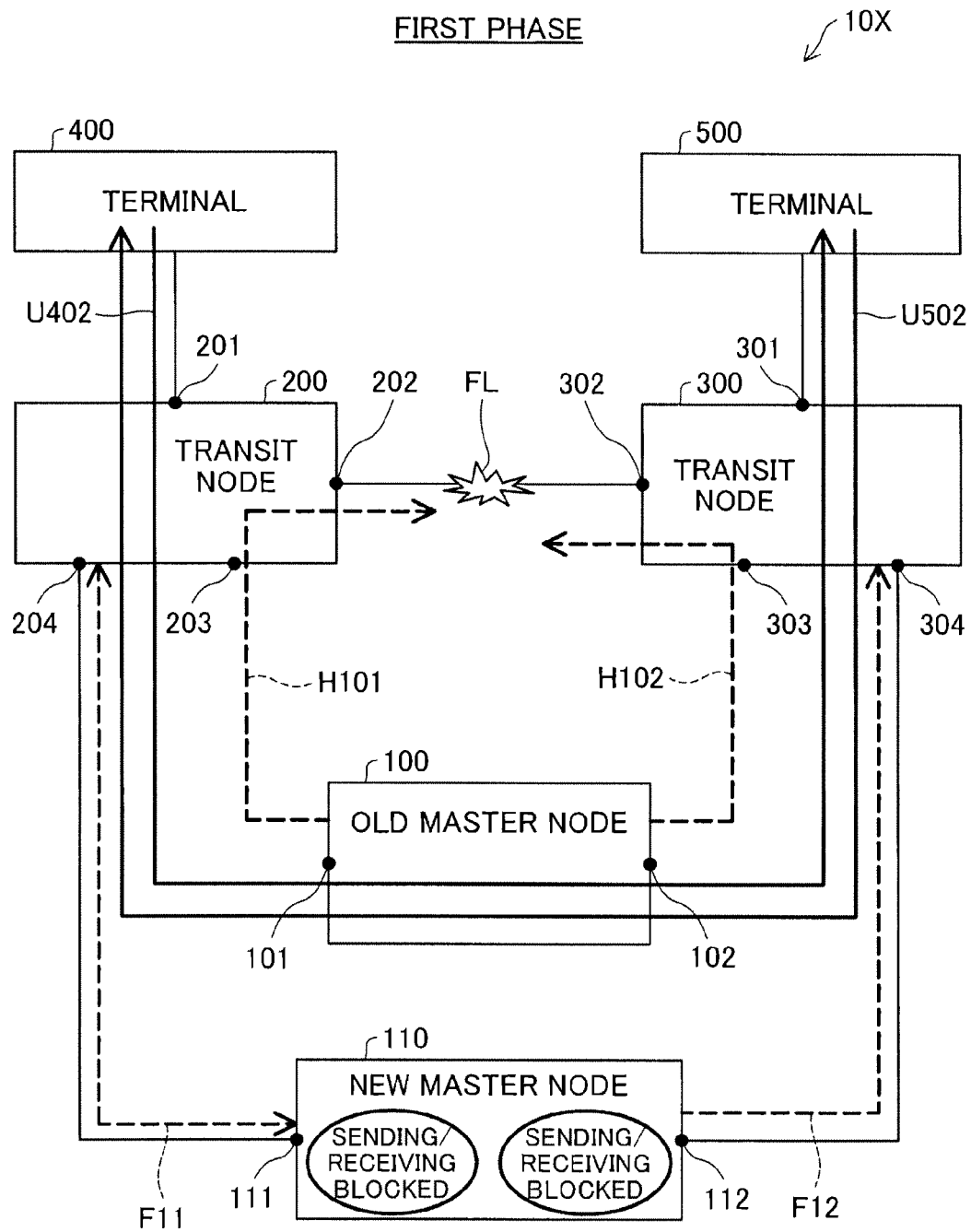
FIG. 31 is a diagram schematically illustrating the forwarding routes in the network system in a first phase of Master Node Replacement Operation 2.

FIG. 31 is a diagram schematically illustrating the forwarding routes in the network system 10X in the first phase of Master Node Replacement Operation 2. The first phase of FIG. 31 in common with the first phase of FIG. 15 in Master Node Replacement Operation 1 is not specifically described here. There is a failure FL between the transit node 200 and the transit node 300. The old master node 100 detects the occurrence of the failure FL by using the health check frames H101 and H102. When the occurrence of the failure FL is detected, the user traffic U402 output from the terminal 400 sequentially goes through the transit node 200, the old master node 100 and the transit node 300 and is sent to the terminal 500. The user traffic U502 output from the terminal 500 sequentially goes through the transit node 300, the old master node 100 and the transit node 200 and is sent to the terminal 400.

The following describes the contents of the ring port status tables 2200A, 2200B and 2200C respectively stored in the old master node 100, the transit node 200 and the transit node 300 and the contents of the FDB tables 2300B and 2300C stored in the transit node 200 and the transit node 300 during transmission of the user traffics U402 and U402 by the forwarding routes. The contents of the ring port status table 2200D stored in the new master node 110 are identical with those of FIG. 12 and are thus not specifically described here. The contents of the FDB tables 2300 stored in the old master node 100 and the new master node 110 are not updated by the master node replacement operation and are thus not specifically described here.

FIG. 32 is a diagram showing the contents of the ring port status table 2200A stored in the old master node 100. The data structure (i.e., fields) of the ring port status table 2200A is identical with that of FIG. 9. The registries in the ring port field 2210, the line status field 2220, the port attribute field 2230 and the logical communication status field 2240 of the control VLAN are identical with those of FIG. 9 and are not specifically described here. Since the failure FL is detected by the control of the ring protocol, the "non-blocked" state is registered in the logical communication status field 2250 of the data VLAN for both the "port 101" and the "port 102".

FIG. 33 is a diagram showing the contents of the ring port status table 2200B stored in the transit node 200. The data structure of the ring port status table 2200B is identical with that of FIG. 10. The registries in the ring port field 2210, the line status field 2220, the port attribute field 2230, the logical communication status field 2240 of the control VLAN and the logical communication status field 2250 of the data VLAN are identical with those of FIG. 10. The frame sent from the port 202 is, however, discarded and does not reach the destination, due to the occurrence of the failure FL.

FIG. 34 is a diagram showing the contents of the ring port status table 2200C stored in the transit node 300. The data structure of the ring port status table 2200C is identical with that of FIG. 11. The registries in the ring port field 2210, the line status field 2220, the port attribute field 2230, the logical communication status field 2240 of the control VLAN and the logical communication status field 2250 of the data VLAN are identical with those of FIG. 11. The frame sent from the port 302 is, however, discarded and does not reach the destination, due to the occurrence of the failure FL.

FIG. 35 is a diagram showing the contents of the FDB table 2300B stored in the transit node 200. The data structure of the FDB table 2300B is identical with that of FIG. 13. The learning status field 2313 of the FDB status table 2310 included in the FDB table 2300B has the registry of "normal" for all the ports in the VLAN.

In the MAC address table 2320 included in the FDB table 2300B, the "port 203" as the port that has received the user traffic U502 is registered in the port number field 2323 of the entry at the lower row. The other registries in the MAC address table 2320 are identical with those of FIG. 13 in Master Node Replacement Operation 1.

FIG. 36 is a diagram showing the contents of the FDB table 2300C stored in the transit node 300. The data structure of the FDB table 2300C is identical with that of FIG. 14. The learning status field 2313 of the FDB status table 2310 included in the FDB table 2300C has the registry of "normal" for all the ports in the VLAN.

In the MAC address table 2320 included in the FDB table 2300C, the "port 303" as the port that has received the user traffic U402 is registered in the port number field 2323 of the entry at the upper row. The other registries in the MAC address table 2320 are identical with those of FIG. 14 in Master Node Replacement Operation 1.

Referring back to FIG. 31, by the monitor start notification frame sending process described above with reference to FIG. 16, when it is determined that "Up" is registered in the line status field 2220 for both the "port 111" and the "port 112" in the ring port status table 2200D, the new master node 110 sends a monitor start notification frame F11 from the port 111 to the control VLAN, while sending a monitor start notification frame F12 from the port 112 to the control VLAN. The first phase in Master Node Replacement Operation 2 corresponds to the first phase in Master Node Replacement Operation 1 described above. The second and subsequent phases in Master Node Replacement Operation 2 similarly correspond to the second and subsequent phases in Master Node Replacement Operation 1 described above.

<Second Phase>

FIG. 37 is a diagram showing the contents of the ring port status table 2200B stored in the transit node 200 after reception of the monitor start notification frame F11. The registry in the logical communication status field 2240 of the control VLAN is updated to the "non-blocked" state for the port 204 by the processing of step S130 in FIG. 17. The registry in the logical communication status field 2250 of the data VLAN is also updated to the "sending blocked" state for the port 204 by the processing of step S150 in FIG. 17.

FIG. 38 is a diagram showing the contents of the FDB status table 2310B stored in the transit node 200 after reception of the monitor start notification frame F11. The registry in the learning status field 2313 is updated to the "learning prohibited" state for the port 203 and the port 202 having the VLAN ID "100" of the control VLAN by the processing of step S120 in FIG. 17. The registry in the learning status field 2313 is updated to the "learning prohibited" state for the port 204 having the VLAN ID "200" of the data VLAN by the processing of step S140 in FIG. 17.

FIG. 39 is a diagram showing the contents of the ring port status table 2200C stored in the transit node 300 after reception of the monitor start notification frame F12. The registry in the logical communication status field 2240 of the control VLAN is updated to the "non-blocked" state for the port 304 by the processing of step S130 in FIG. 17. The registry in the logical communication status field 2250 of the data VLAN is also updated to the "sending blocked" state for the port 304 by the processing of step S150 in FIG. 17.

FIG. 40 is a diagram showing the contents of the FDB status table 2310C stored in the transit node 300 after reception of the monitor start notification frame F12. The registry in the learning status field 2313 is updated to the "learning prohibited" state for the port 303 and the port 302 having the VLAN ID "100" of the control VLAN by the processing of step S120 in FIG. 17. The registry in the learning status field 2313 is updated to the "learning prohibited" state for the port 304 having the VLAN ID "200" of the data VLAN by the processing of step S140 in FIG. 17.

Figure 41:
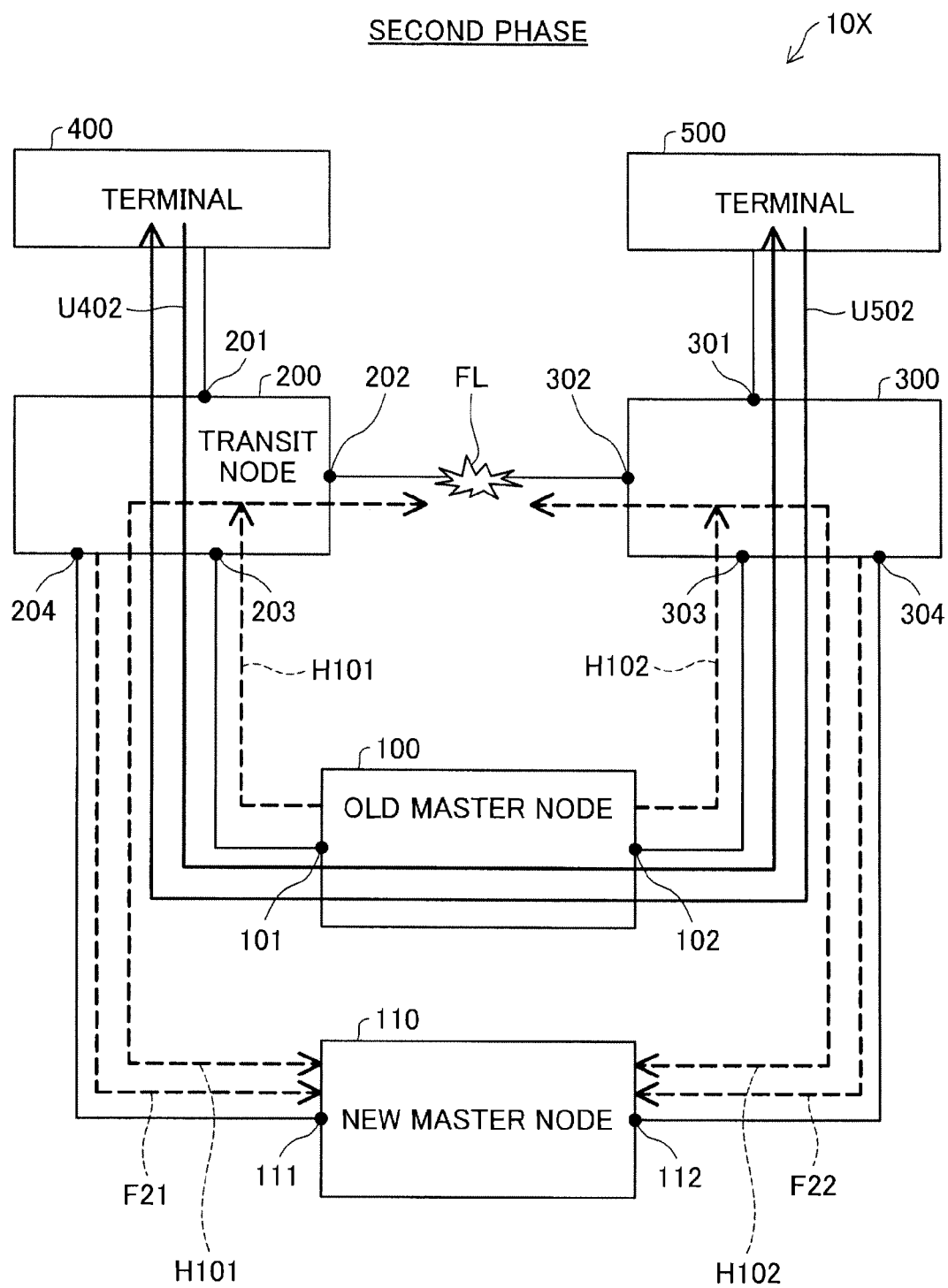
FIG. 41 is a diagram schematically illustrating the forwarding routes in the network system in a second phase of Master Node Replacement Operation 2.

FIG. 41 is a diagram schematically illustrating the forwarding routes in the network system 10X in the second phase of Master Node Replacement Operation 2. As illustrated in FIG. 41, when receiving the monitor start notification frame F11 (FIG. 31), the transit node 200 sends a monitor start response frame F21. When receiving the monitor start notification frame F12, the transit node 300 sends a monitor start response frame F22. The new master node 110 receives the monitor start response frames F21 and F22 but does not relay the received monitor start response frames F21 and F22.

When receiving the health check frame H101 at the port 203, the transit node 200 refers to the ring port status table 2200B (FIG. 37) and forwards the received health check frame H101 to the ports 202 and 204 having the registry of "non-blocked" state in the logical communication status field 2240 of the control VLAN among all the ports other than the frame-receiving port 203. The logical communication status of the port 204 has been changed to the "non-blocked" state by the processing of step S130 in FIG. 17. As a result of such forwarding, the health check frame H101 is sent from the transit node 200 to both the new master node 110 and the transit node 300.

When receiving the health check frame H102 at the port 303, the transit node 300 refers to the ring port status table 2200C (FIG. 39) and forwards the received health check frame H102 to the ports 302 and 304 having the registry of "non-blocked" state in the logical communication status field 2240 of the control VLAN among all the ports other than the frame-receiving port 303. The logical communication status of the port 304 has been changed to the "non-blocked" state by the processing of step S130 in FIG. 17. As a result of such forwarding, the health check frame H102 is sent from the transit node 300 to both the new master node 110 and the transit node 200.

The occurrence of the failure FL interrupts the transmission of the health check frame H101 from the transit node 200 toward the transit node 300 and the transmission of the health check frame H102 from the transit node 300 toward the transit node 200. The new master node 110 accordingly fails to receive the health check frames for reception monitoring, i.e., the health check frame H101 at the port 112 and the health check frame H102 at the port 111. When failing to receive the health check frames H101 and H102 for reception monitoring, the new master node 110 detects the occurrence of a failure in the ring network and registers the "non-blocked" state in the logical communication status field 2250 of the data VLAN.

FIG. 42 is a diagram showing the contents of the ring port status table 2200D stored in the new master node 110 on the occurrence of a failure. As illustrated in FIG. 42, the registry in the logical communication status 2250 of the data VLAN is changed to the "non-blocked" state for the ports 111 and 112 (hatched boxes) in the ring port status table 2200D.

<Third Phase>

Figure 43:
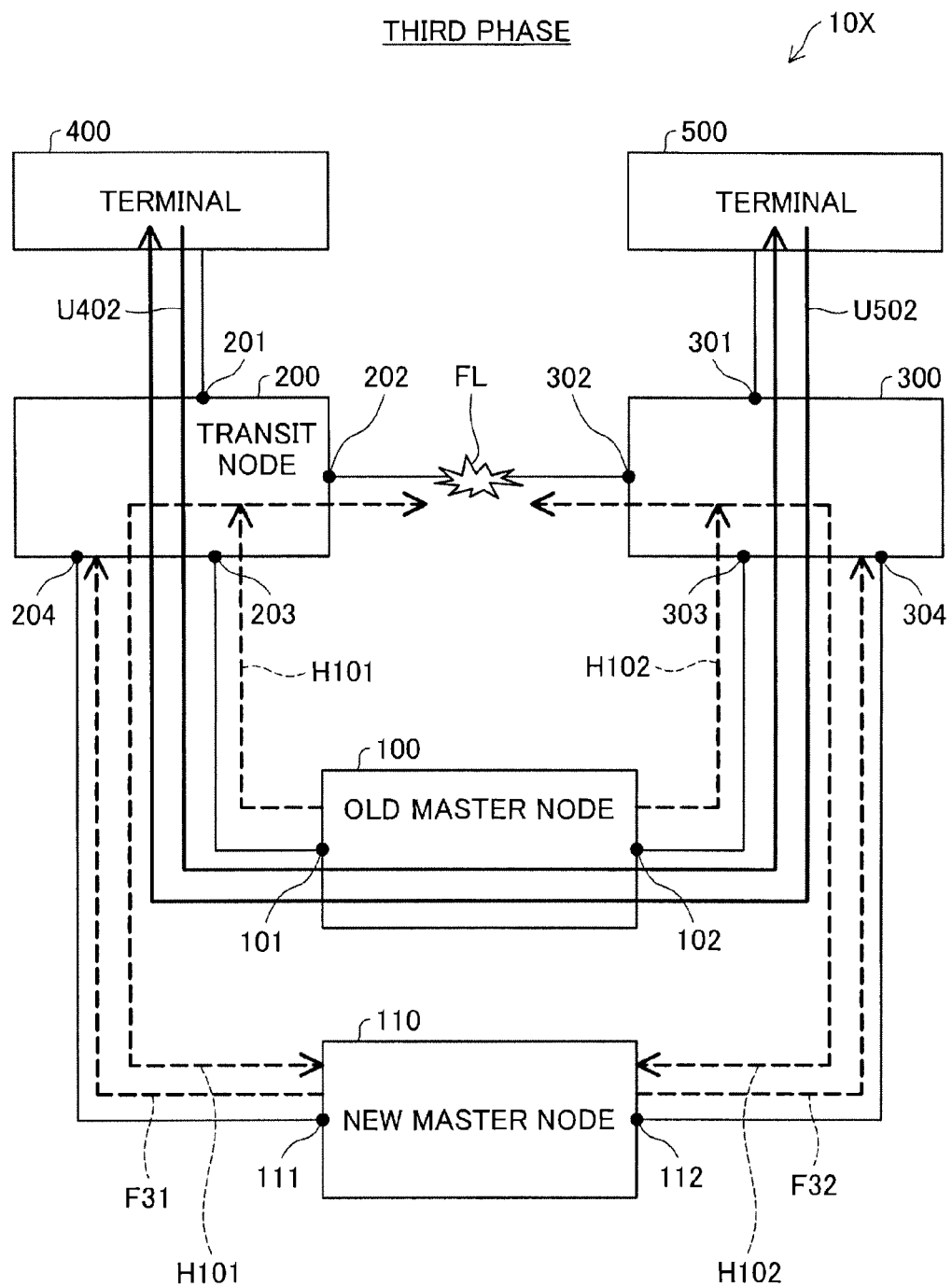
FIG. 43 is a diagram schematically illustrating the forwarding routes in the network system in a third phase of Master Node Replacement Operation 2.

FIG. 43 is a diagram schematically illustrating the forwarding routes in the network system 10X in the third phase of Master Node Replacement Operation 2. The forwarding routes of the health check frames H101 and H102 are identical with those shown in FIG. 41 and are thus not specifically described here. When receiving the monitor start response frames F21 and F22 (FIG. 41) at the ports 111 and 112, the new master node 110 sends a transition start notification frame F31 from the port 111 to the control VLAN, while sending a transition start notification frame F32 from the port 112 to the control VLAN.

<Fourth Phase>

The fourth phase is the phase immediately after the transit nodes 200 and 300 receive the transition start notification frames F31 and F32. In the fourth phase, the transition start notification frame receiving process (FIG. 26) described above is performed by the transit nodes 200 and 300. The processing of steps S220 and S230 in the transition start notification frame receiving process is effective for Master Node Replacement Operation 2 and is thus described in detail here.

As shown in FIG. 26, when it is determined at step S210 that the registry in the port attribute field 2230 of the port that has received the transition start notification frame F31 or F32 is the "join" port, the ring protocol processor 1000 goes to steps S220 and S230. At step S220, the ring protocol processor 1000 searches the FDB status table 2310 (FIGS. 38 and 40) included in the FDB table 2300 for any entry with the combination of the VLAN ID of the data VLAN (i.e., ID "200") registered in the VLAN ID field 2311 and the port number of the "leave" port registered in the port number field 2312 and changes the registry in the learning status field 2313 of the matching entry to the "learning prohibited" state. At step S220, the ring protocol processor 1000 also searches the MAC address table 2320 included in the FDB table 2300 (FIGS. 35 and 36) for any entry with the combination of the VLAN ID of the data VLAN (i.e., ID "200") registered in the VLAN ID field 2321 and the port number of the "leave" port registered in the port number field 2323 and deletes the matching entry.

At subsequent step S230, the ring protocol processor 1000 changes the registry in the logical communication status field 2250 of the data VLAN for the port having the "leave" attribute in the port attribute field 2230 to the "sending blocked" state in the ring port status table 2200 (FIGS. 33 and 34), while changing the registry in the logical communication status field 2250 of the data VLAN for the port having the "join" attribute in the port attribute field 2230 to the "non-blocked" state. After step S230, the ring protocol processor 1000 goes to step S240 and S250, which are described in detail above.

The transition start notification frames F31 and F32 sent from the ports 111 and 112 (FIG. 43) may not simultaneously reach the transit nodes 200 and 300. The following describes the forwarding routes and the registries in the fourth phase in the case where the transition start notification frame F31 reaches the transit node 200 before the transition start notification frame F32 reaches the transit node 300, with reference to FIGS. 44 to 49. The following description is similarly applied to the case where the transition start notification frame F32 reaches the transit node 300 before the transition start notification frame F31 reaches the transit node 200.

FIG. 44 is a diagram showing the contents of the ring port status table 2200B stored in the transit node 200 after reception of the transition start notification frame F31. By the reception of the transition start notification frame F31, the contents of the ring port status table 2200B change from the state of FIG. 37 to the state of FIG. 44. The processing of step S230 in FIG. 26 updates the registry in the logical communication status field 2250 of the data VLAN of the matching entry corresponding to the "leave" port 203 to the "sending blocked" state, while updating the registry in the logical communication status field 2250 of the data VLAN of the matching entry corresponding to the "join" port 204 to the "non-blocked" state (hatched boxes).

FIG. 45 is a diagram showing the contents of the FDB status table 2310B stored in the transit node 200 after reception of the transition start notification frame F31. By the reception of the transition start notification frame F31, the contents of the FDB status table 2310B change from the state of FIG. 38 to the state of FIG. 45. The processing of step S220 in FIG. 26 updates the registry in the learning status field 2313 of the matching entry corresponding to the combination of the VLAN ID "200" of the data VLAN and the "leave" port 203 to the "learning prohibited" state (hatched box).

Figure 46:
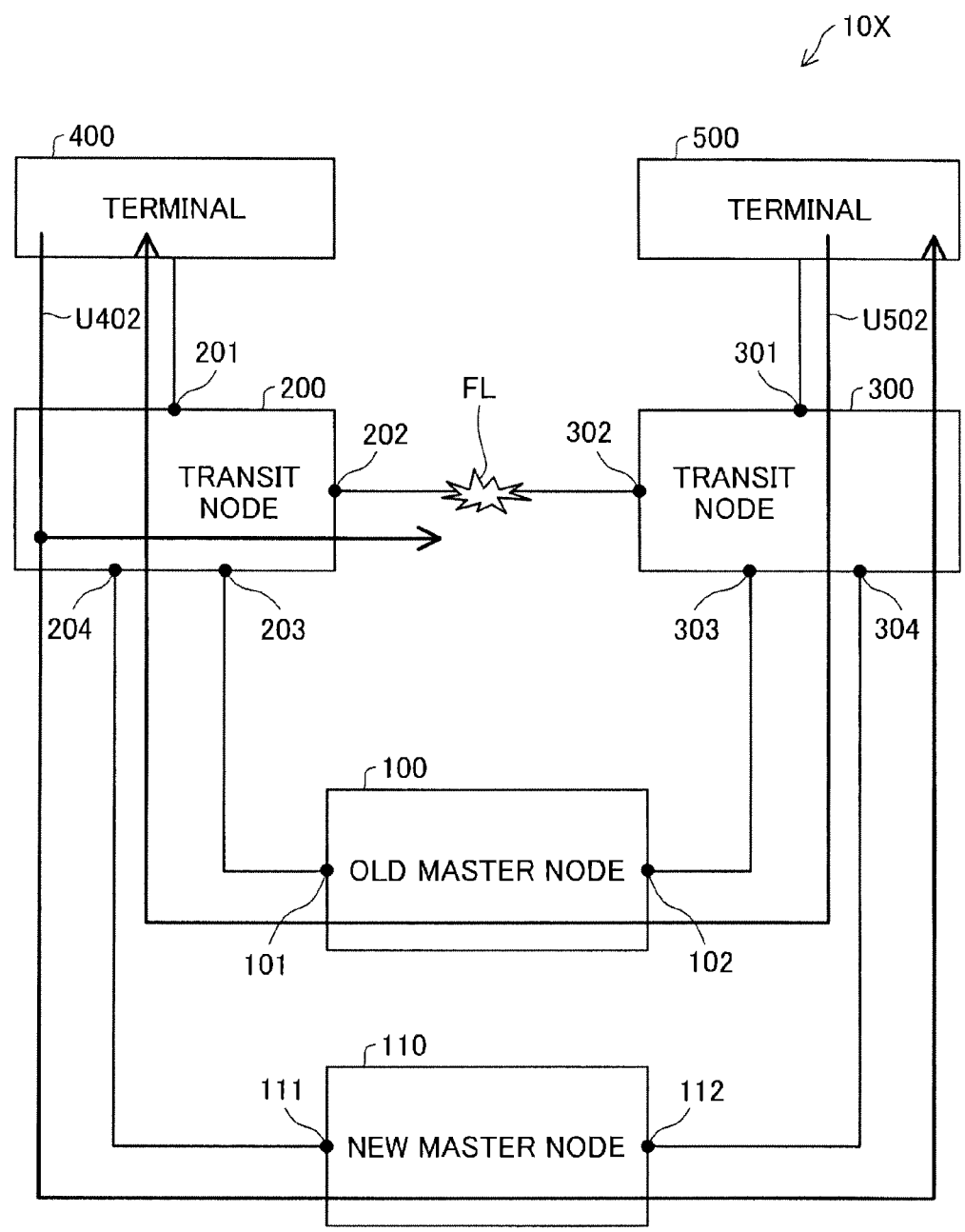
FIG. 46 is a diagram illustrating the forwarding routes of user traffics in the case where the transit node has received the transition start notification frame but the transit node has not yet received a transition start notification frame.

FIG. 46 is a diagram illustrating the forwarding routes of user traffics in the case where the transit node 200 has received the transition start notification frame F31 but the transit node 300 has not yet received the transition start notification frame F32. The forwarding routes of the health check frames are identical with those of FIG. 41.

The following describes the forwarding routes of user traffic U402. When receiving the user traffic U402 addressed to the terminal 500 and sent from the terminal 400, the transit node 200 forwards the received user traffic U402 to the ports 202 and 203 having the registry of "non-blocked" state in the logical communication status field 2250 of the data VLAN in the ring port status table 2200B (FIG. 44). The user traffic U402 sent from the port 202 is, however, discarded by the occurrence of the failure FL.

The port 203 is not the subject of transmission, since the registry in the logical communication status field 2250 of the data VLAN for the port 203 has been changed to the "sending blocked" state in the ring port status table 2200B (FIG. 44) by the processing of step S230 in FIG. 26.

When receiving the user traffic U402, the new master node 110 forwards the received user traffic U402 to the port 112 having the registry of "non-blocked" state in the logical communication status field 2250 of the data VLAN in the ring port status table 2200D (FIG. 42).

When receiving the user traffic U402, the transit node 300 forwards the received user traffic U402 to the ports 302 and 303 having the registry of "non-blocked" state in the logical communication status field 2250 of the data VLAN in the ring port status table 2200C (FIG. 39) and the port 301 exempt from the control of the ring protocol. The user traffic U402 sent from the port 302 is, however, discarded by the occurrence of the failure FL. As described previously with reference to FIG. 10, in the data VLAN, the frame received at the port having the registry of either the "join" attribute or the "leave" attribute in the port attribute field 2230 of the ring port status table 2200 is forwarded only to the port having the registry of the "ordinary" attribute in the port attribute field 2230 and the port exempt from the control of the ring protocol. As a result, the user traffic U402 is not forwarded to the port 303 but is forwarded only to the port 301 in the transit node 300.

The following describes the forwarding routes of user traffic U502. When receiving the user traffic U502 addressed to the terminal 400 and sent from the terminal 500, the transit node 300 forwards the received user traffic U502 to the ports 302 and 303 having the registry of "non-blocked" state in the logical communication status field 2250 of the data VLAN in the ring port status table 2200C (FIG. 39). The user traffic U502 sent from the port 302 is, however, discarded by the occurrence of the failure FL.

The port 304 is not the subject of transmission, since the registry in the logical communication status field 2250 of the data VLAN for the port 304 has been changed to the "sending blocked" state in the ring port status table 2200C (FIG. 39) by the processing of step S150 in FIG. 17.

When receiving the user traffic U502, the old master node 100 forwards the received user traffic U502 to the port 101 having the registry of "non-blocked" state in the logical communication status field 2250 of the data VLAN in the ring port status table 2200A (FIG. 32A).

When receiving the user traffic U502, the transit node 200 forwards the received user traffic U502 to the ports 202 and 203 having the registry of "non-blocked" state in the logical communication status field 2250 of the data VLAN in the ring port status table 2200B (FIG. 44) and the port 201 exempt from the control of the ring protocol. The user traffic U502 sent from the port 202 is, however, discarded by the occurrence of the failure FL. Forwarding of the user traffic is prohibited between the port having the "join" attribute and the port having the "leave" attribute. As a result, the user traffic U502 is not forwarded to the port 203 but is forwarded only to the port 201 in the transit node 200.

Figure 47:
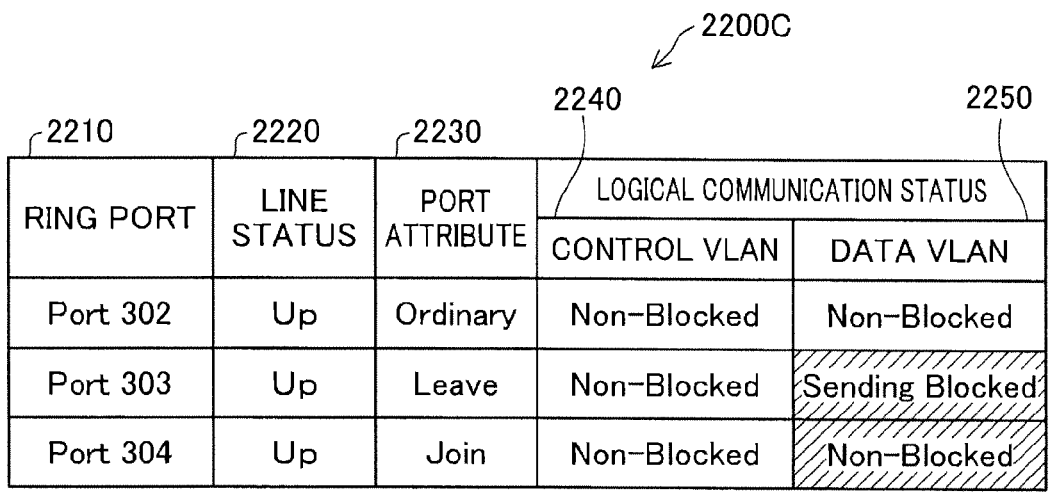
FIG. 47 is a diagram showing the contents of the ring port status table stored in the transit node after reception of the transition start notification frame.

FIG. 47 is a diagram showing the contents of the ring port status table 2200C stored in the transit node 300 after reception of the transition start notification frame F32. The processing of step S230 in FIG. 26 updates the registry in the logical communication status field 2250 of the data VLAN of the matching entry corresponding to the "leave" port 303 to the "sending blocked" state, while updating the registry in the logical communication status field 2250 of the data VLAN of the matching entry corresponding to the "join" port 304 to the "non-blocked" state (hatched boxes).

Figure 48:
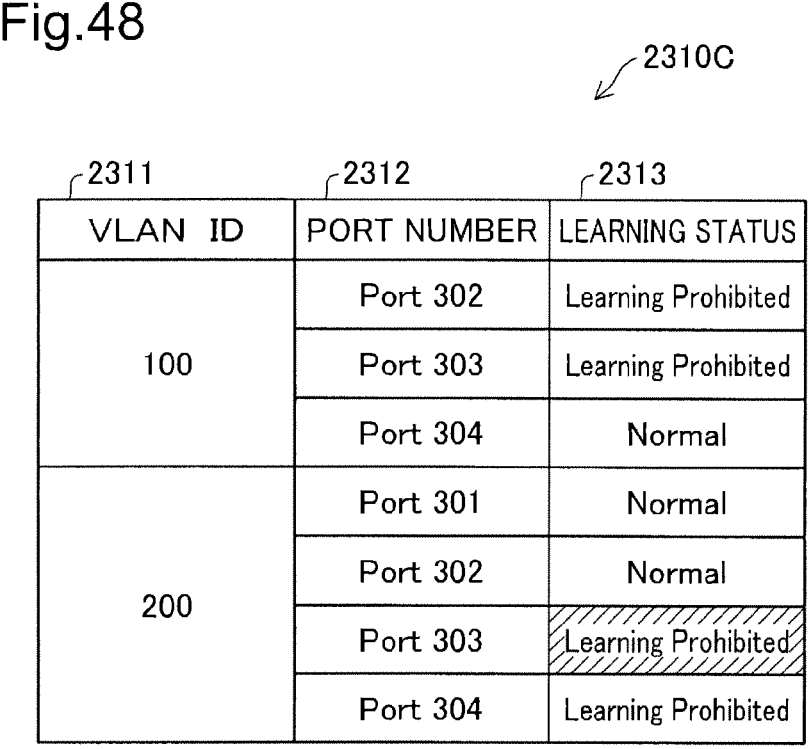
FIG. 48 is a diagram showing the contents of the FDB status table stored in the transit node after reception of the transition start notification frame.

FIG. 48 is a diagram showing the contents of the FDB status table 2310C stored in the transit node 300 after reception of the transition start notification frame F32. The processing of step S220 in FIG. 26 updates the registry in the learning status field 2313 of the matching entry corresponding to the combination of the VLAN ID "200" of the data VLAN and the "leave" port 303 to the "learning prohibited" state (hatched box).

Figure 49:
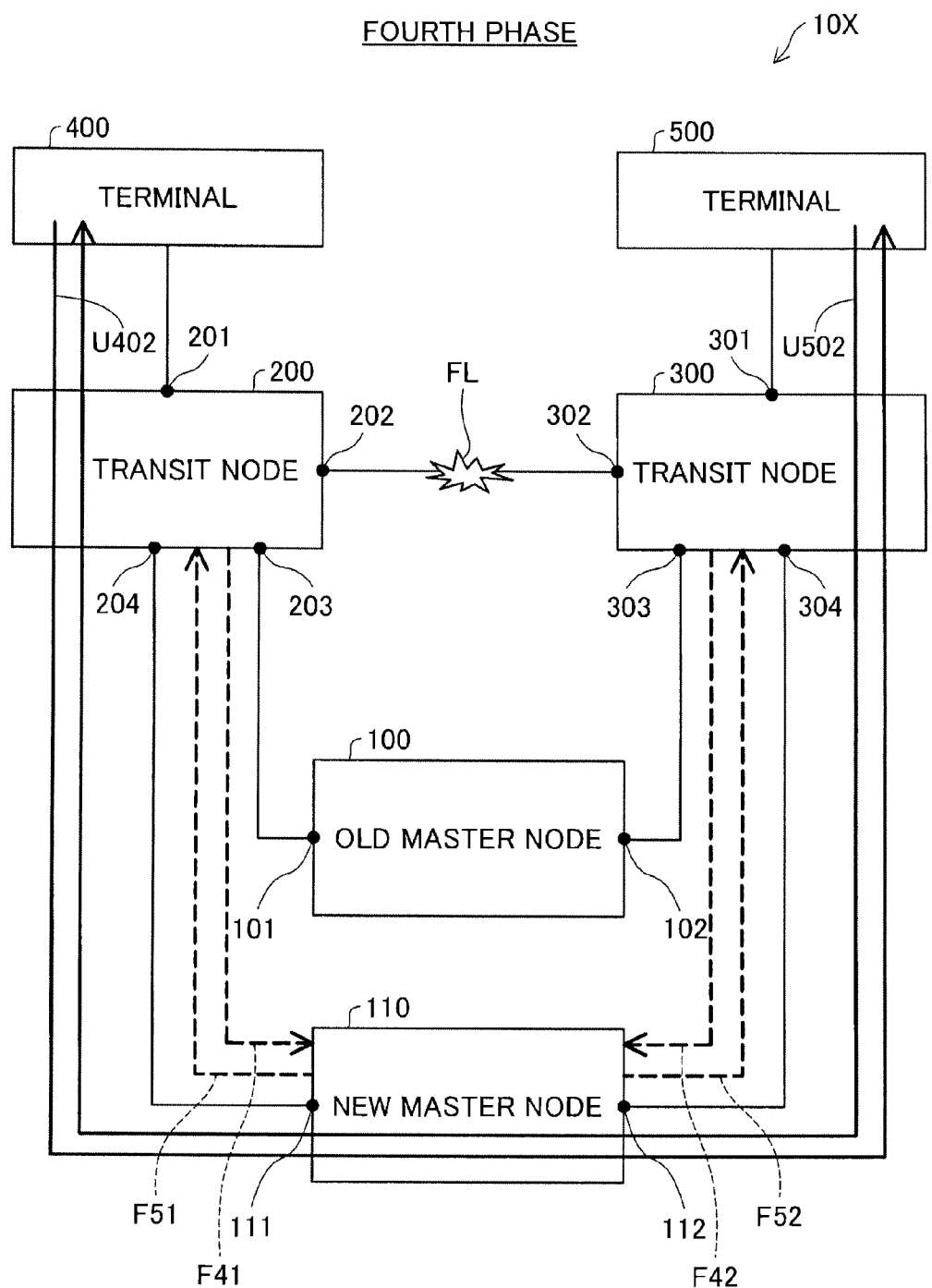
FIG. 49 is a diagram schematically illustrating the forwarding routes in the network system in a fourth phase of Master Node Replacement Operation 2.

FIG. 49 is a diagram schematically illustrating the forwarding routes in the network system 10X in the fourth phase of Master Node Replacement Operation 2. The forwarding routes of the health check frames are identical with those shown in FIG. 41 and are thus not specifically described here. As illustrated in FIG. 49, the transit node 200 sends a transition start response frame F41 from the port 204, while the transit node 300 sends a transition start response frame F42 from the port 304 (step S240 in FIG. 26).

When receiving the transition start response frames F41 and F42 at both the ports 111 and 112, the new master node 110 sends a transition end notification frame F51 from the port 111 to the control VLAN, while sending a transition end notification frame F52 from the port 112 to the control VLAN (step S270 in FIG. 27).

The registries in the logical communication status field 2250 of the data VLAN for both the ports 203 and 303 have been changed to the "sending blocked" state in the ring port status table 2200B (FIG. 44) of the transit node 200 and the ring port status table 2200C (FIG. 47) of the transit node 300 by the processing of step S230 in FIG. 26. The user traffics U402 and U502 are accordingly forwarded by the forwarding routes going through the new master node 110. The details of the forwarding routes are similar to the forwarding route of the user traffic U402 shown in FIG. 46 and are thus not specifically described here.

<Fifth Phase>

Figure 50:
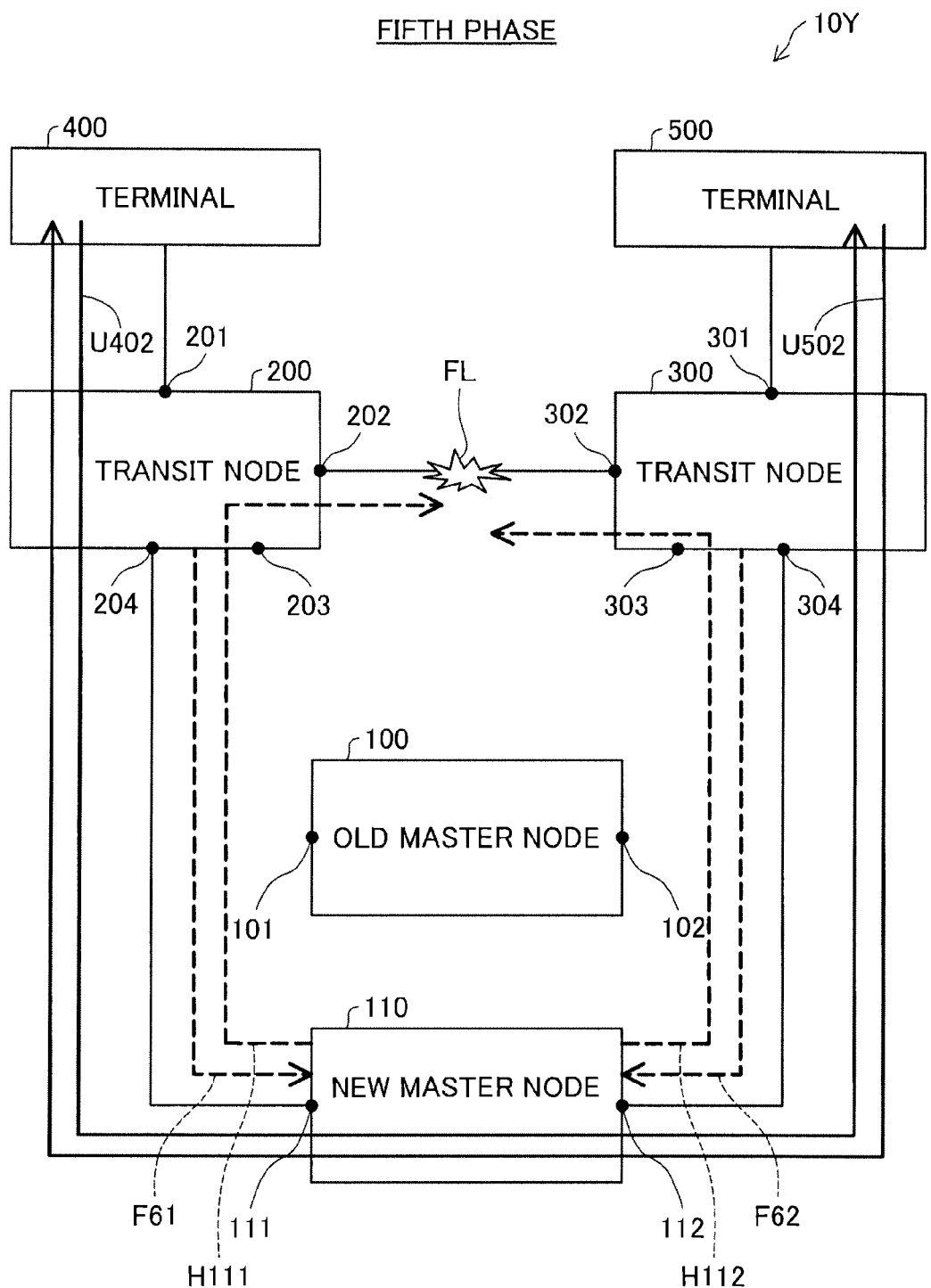
FIG. 50 is a diagram schematically illustrating the forwarding routes in the network system in a fifth phase of Master Node Replacement Operation 2.

FIG. 50 is a diagram schematically illustrating the forwarding routes in the network system 10Y in the fifth phase of Master Node Replacement Operation 2. As illustrated in FIG. 50, the transit node 200 sends a transition end response frame F61 from the port 204, while the transit node 300 sends a transition end response frame F62 from the port 304 (step S330 in FIG. 29).

The new master node 110 receives the transition end response frames F61 and F62 at the ports 111 and 112 that have respectively sent the transition end notification frames F51 and F52. On condition that the transition end response frames F61 and F62 are received or on condition that the health check frames H101 and H102 for transmission monitoring are not received at the ports 111 and 112, the new master node 110 starts sending health check frames H111 and H112.

<Sixth Phase>

Lastly, in the sixth phase of Master Node Replacement Operation 2, the following operations (a) to (c) are performed:

(a) The transit nodes 200 and 300 respectively search the ring port status tables 2200B and 2200C (FIGS. 44 and 47) for any entries with the registry of the "leave" port in the port attribute field 2230 and delete the matching entries of the "leave" port from the configuration tables 2100B and 2100C (FIGS. 6 and 7);

(b) The transit nodes 200 and 300 respectively change the registries in the port attribute field 2230 of the "join" port to "ordinary" in the ring port status tables 2200B and 2200C; and (c) The new master node 110 changes the node mode from "new master node" to "master node" in the configuration table 2100D.

After these series of operations, all the procedure of Master Node Replacement Operation 2 is completed. When the node mode of the new master node 110 is changed from "new master node" to "master node" in the configuration table 2100D, the logical communication statuses of the new master node 110 at the moment are registered in the logical communication status field 2240 of the control VLAN and the logical communication status field 2250 of the data VLAN in the ring port status table 2200D.

F. Advantageous Effects of Embodiment

In the network system 10 of the embodiment described above, the new master node 110 is connected between the transit node 200 and the transit node 300 to be arranged in parallel with the old master node 100 as the object to be replaced. The new master node 110 sends the monitor start notification frames F11 and F12 from both the ports 111 and 112, so as to control the registries in the logical communication status field 2240 of the control VLAN stored in the adjacent nodes 200 and 300 that have received the monitor start notification frames F11 and F12. The forwarding routes of the health check frames H101 and H102 are then changed to the forwarding routes going through the new master node 110. The new master node 110 can monitor the ring network by receiving the health check frames H101 and H102. This enables continuous monitoring for a failure occurring in the ring network even during replacement of the old master node 110 with the new master node 110. While both the old master node 100 and the new master node 110 are connected with the ring network, only the health check frames H101 and H102 sent from the old master node 100 are transmitted through the ring network. This avoids duplicated transmission of health check frames through the ring network.

In the network system 10 of the embodiment, after changing the forwarding routes of the health check frames H101 and H102 to the forwarding routes going through the new master node 110, the transit nodes 200 and 300 link down their "leave" ports to disable the monitoring function of the old master node 100 in the ring network. The new master node 110 detects disabling the old master node 100 by receiving the transition end response frames F61 and F62. In response to such detection, the new master node 110 starts sending the health check frames H111 and H112. As a result, the new master node 110 can monitor the ring network without assistance of the old master node 100. The replacement of the master node in the ring network is thus completed in this manner.

Additionally, in the network system 10 of the embodiment, both the old master node 100 as the object to be replaced and the new master node 100 as the replacement are not separated from the ring network during the replacement operation. This advantageously maintains the redundancy of the ring network and the failure monitoring function, thus effectively preventing undesired stoppage of the transmission of user traffic and the change in topology.

G. Modifications

<Modification 1>

The configurations of the respective tables stored in the network devices are illustrated in the embodiment and its modifications described above. The fields included in the respective tables may be determined arbitrarily within the scope of the invention. For example, the respective tables may have other adequate fields, in addition to those described above.

<Modification 2>

In the embodiment and its modifications described above, the ring network consists of three network devices, and the master node serving as the monitoring device is replaced by newly adding one network device to be used as a new master node and subsequently detaching one network device used as the old master node. According to another embodiment, the ring network may consist of four or any greater number of network devices. In this configuration, only one of the network devices works as the master node, and the other network devices work as the transit nodes. A new master node is connected between adjacent transit nodes located adjacent to the old master node as the object to be replaced (i.e., between two transit nodes respectively connected with the two ring ports of the old master node) to be arranged in parallel with the old master node. For example, in the ring network consisting of four network devices, one additional transit node is connected between the ring port 202 of the transit node 200 and the ring port 303 of the transit node 300 in the configuration of FIG. 15.

<Modification 3>

In the embodiment and its modifications described above, the following four frames (a) to (d) are provided as the control frames for monitoring the status of the ring network. All these control frames may, however, be not necessarily used:

(a) health check frame H101 for reception monitoring that is sent from the ring port 101 of the old master node 100 and to be received at the ring port 112 of the new master node 110;

(b) health check frame H102 for reception monitoring that is sent from the ring port 102 of the old master node 100 and to be received at the port 111 of the new master node 110;

(c) health check frame H101 for transmission monitoring that is sent from the ring port 101 of the old master node 100 and to be received at the ring port 111 of the new master node 110; and (d) health check frame H102 for transmission monitoring that is sent from the ring port 102 of the old master node 100 and to be received at the ring port 112 of the new master node 110.

According to other embodiments, the configuration of the invention may monitor the status of the ring network by using only the control frame (a) among the four control frames (a) to (d) or by using only the control frame (b). According to other embodiments, the configuration of the invention may monitor the status of the ring network by using only the control frames (b) and (c) or by using only the control frames (a) and (d).

<Modification 4>

Part of the hardware configuration in the above embodiment and its modifications may be implemented by the software configuration, and, on the contrary, part of the software configuration in the above embodiment and its modifications may be implemented by the hardware configuration.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A network device to be used as a replacement for a monitoring device as an object to be replaced, the monitoring device being provided as part of a ring network and configured to monitor status of the ring network by repeatedly sending a control frame used to monitor the status of the ring network from one of two ring ports and receiving the control frame at the other of the two ring ports, the network device comprising:

a link-up detector configured to detect that two ring ports of the network device are set in link-up state, when the network device is connected between first and second adjacent network devices, which are located adjacent to the monitoring device in the ring network, to be arranged in parallel with the monitoring device;

a forwarding instructor configured to, when the link-up state is detected by the link-up detector, give an instruction to forward the control frame by a forwarding route going through the network device, to the first adjacent network device connected with the ring port of the monitoring device that receives the control frame, out of the first and second adjacent network devices; and a replacement-time monitor configured to monitor the status of the ring network by receiving the control frame sent from the first adjacent network device.

2. The network device according to claim 1, further comprising:

a ring port status table used to specify state of each ring port and configured to include a logical communication status filed of a control VLAN used in communication of the control frame, wherein the forwarding instructor gives the instruction by changing registry in the logical communication status field of the control VLAN in the ring port status table.

3. The network device according to claim 1, further comprising:

a monitoring disabled detector configured to detect that monitoring function of the monitoring device is disabled in the ring network; and a monitoring processor configured to, when disabling the monitoring function of the monitoring device is detected by the monitoring disabled detector, enable the network device itself to start sending the control frame, so as to monitor the status of the ring network.

4. The network device according to claim 1, wherein when the link-up state is detected by the link-up detector, the forwarding instructor gives the instruction to forward the control frame by the forwarding route going through the network device, to the second adjacent network device located upstream in a flow of the control frame, out of the first and second adjacent network devices, and the replacement-time monitor monitors the status of the ring network by receiving the control frame sent from the first adjacent network device and the control frame sent from the second adjacent network device.

5. The network device according to claim 1, wherein
the monitoring device comprises a data forwarding controller, wherein on condition that the control frame is received at the other ring port, the data forwarding controller determines that the ring network is normal and sets one of the two ring ports of the monitoring device in a sending/receiving disabled state that is incapable of sending and receiving user traffic, and on condition that the control frame is not received at the other ring port, the data forwarding controller determines that the ring network is abnormal and changing setting of the ring port, which has been set in the sending/receiving disabled state, to a sending/receiving enabled state that is capable of sending and receiving the user traffic.

6. In a ring network including a monitoring device provided as part of the ring network and configured to monitor status of the ring network by repeatedly sending a control frame used to monitor the status of the ring network from one of two ring ports and receiving the control frame at the other of the two ring ports, a network device connected with the ring port of the monitoring device used to receive the control frame, the network device comprising:

a start notification frame receiver configured to receive a start notification frame sent from a new network device, on condition that the new network device used as a replacement for the monitoring device as an object to be replaced is located between the network device and an adjacent network device connected with the ring port of the monitoring device used to send the control frame in the ring network to be arranged in parallel with the monitoring device and that two ring ports of the new network device are set in link-up state; and a control frame forwarder configured to, when the start notification frame is received, forward the control frame sent from the monitoring device by a forwarding route going through the new network device.

7. A network system comprising:
a first monitoring network device provided as part of a ring network and configured to monitor status of the ring network by repeatedly sending a control frame used to monitor the status of the ring network from one of two ring ports and receiving the control frame at the other of the two ring ports; and, a second monitoring network device used as a replacement for the first monitoring network device as an object to be replaced, wherein
the second monitoring network device includes
a link-up detector configured to detect that two ring ports of the second monitoring network device are set in link-up state, when the second monitoring network device is connected between first and second adjacent network devices to be arranged in parallel with the first monitoring network device, the first and second adjacent network devices being located adjacent to the first monitoring network device in the ring network a forwarding instructor configured to, when the link-up state is detected by the link-up detector, give an instruction to forward the control frame by a forwarding route going through the second monitoring network device, to the first adjacent network device connected with the ring port of the first monitoring network device that receives the control frame, out of the first and second adjacent network devices; and a replacement-time monitor configured to monitor the status of the ring network by receiving the control frame sent from the first adjacent network device.

8. The network system according to claim 7, wherein
the first monitoring device further comprises a data forwarding controller, wherein on condition that the control frame is received at the other ring port, the data forwarding controller determines that the ring network is normal and sets one of the two ring ports of the first monitoring device in a sending/receiving disabled state that is incapable of sending and receiving user traffic, and on condition that the control frame is not received at the other ring port, the data forwarding controller determines that the ring network is abnormal and changing setting of the ring port, which has been set in the sending/receiving disabled state, to a sending/receiving enabled state that is capable of sending and receiving the user traffic.

9. The network system according to claim 7, the second monitoring device further comprising:
a ring port status table used to specify state of each ring port and configured to include a logical communication status filed of a control VLAN used in communication of the control frame, wherein
the forwarding instructor gives the instruction by changing registry in the logical communication status field of the control VLAN in the ring port status table.

10. The network system according to claim 7, the second monitoring device further comprising:
a monitoring disabled detector configured to detect that monitoring function of the monitoring device is disabled in the ring network; and a monitoring processor configured to, when disabling the monitoring function of the first monitoring device is detected by the monitoring disabled detector, enable the network device itself to start sending the control frame, so as to monitor the status of the ring network.

11. The network system according to claim 7, when the link-up state is detected by the link-up detector, the forwarding instructor gives the instruction to forward the control frame by the forwarding route going through the second monitoring network device, to the second adjacent network device located upstream in a flow of the control frame, out of the first and second adjacent network devices, and the replacement-time monitor monitors the status of the ring network by receiving the control frame sent from the first adjacent network device and the control frame sent from the second adjacent network device.

* * * * *